US012443118B2

(12) United States Patent
Shimizu et al.

(10) Patent No.: US 12,443,118 B2

(45) **Date of Patent: *Oct. 14, 2025**

(54) ELECTROPHOTOGRAPHIC PHOTOSENSITIVE MEMBER, PROCESS CARTRIDGE, AND IMAGE FORMING APPARATUS

(71) Applicant: KYOCERA Document Solutions Inc., Osaka (JP)

(72) Inventors: Tomofumi Shimizu, Osaka (JP); Makoto Shishido, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 767 days.

This patent is subject to a terminal disclaimer.

(21) Appl. No.: 17/664,997

(22) Filed: May 25, 2022

(65) Prior Publication Data

US 2022/0397835 A1 Dec. 15, 2022

(30) Foreign Application Priority Data

May 26, 2021 (JP) ................................ 2021-088352

(51) Int. Cl.
*G03G 5/05* (2006.01)
*G03G 5/06* (2006.01)
*G03G 21/18* (2006.01)

(52) U.S. Cl.
CPC ......... *G03G 5/0567* (2013.01); *G03G 5/0609* (2013.01); *G03G 5/0631* (2013.01); *G03G 5/0648* (2013.01); *G03G 21/1814* (2013.01)

(58) Field of Classification Search
CPC .... G03G 5/0528; G03G 5/0564; G03G 5/056; G03G 5/0592; G03G 5/06142; G03G 5/06144; G03G 5/0618
See application file for complete search history.

(56) References Cited

U.S. PATENT DOCUMENTS

2020/0233324 A1* 7/2020 Shimizu ............... G03G 5/0677
2020/0356017 A1* 11/2020 Ezure ................. G03G 5/06142
(Continued)

FOREIGN PATENT DOCUMENTS

CN 106249555 * 12/2016 ............... G03G 5/06
JP H10-020514 A 1/1998

OTHER PUBLICATIONS

Translation of CN 106249555.*

*Primary Examiner* — Peter L Vajda
(74) *Attorney, Agent, or Firm* — Studebaker Brackett PLLC

(57) ABSTRACT

A single-layer photosensitive layer included in an electrophotographic photosensitive member contains a charge generating material, a hole transport material, an electron transport material, and a binder resin. The binder resin includes a polyarylate resin. The polyarylate resin includes repeating units represented by formulas (1), (2), (3), and (4).

(1)

(2)

(3)

(Continued)

-continued

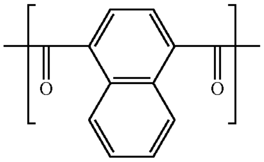

(4)

The percentage of the number of repeats of the repeating unit represented by formula (3) relative to a total of the number of repeats of the repeating unit represented by formula (1) and the number of repeats of the repeating unit represented by formula (3) is greater than 0% and less than 20%.

20 Claims, 4 Drawing Sheets

(56) References Cited

U.S. PATENT DOCUMENTS

2022/0404724 A1* 12/2022 Shimizu ................. G03G 5/056
2022/0413404 A1* 12/2022 Shimizu .................. C07C 50/12

* cited by examiner

ELECTROPHOTOGRAPHIC PHOTOSENSITIVE MEMBER, PROCESS CARTRIDGE, AND IMAGE FORMING APPARATUS

INCORPORATION BY REFERENCE

The present application claims priority under 35 U.S.C. § 119 to Japanese Patent Application No. 2021-088352, filed on May 26, 2021. The contents of this application are incorporated herein by reference in their entirety.

BACKGROUND

The present disclosure relates to an electrophotographic photosensitive member, a process cartridge, and an image forming apparatus.

An electrophotographic image forming apparatus (e.g., a printer or a multifunction peripheral) includes an electrophotographic photosensitive member as an image bearing member. The electrophotographic photosensitive member includes a photosensitive layer. Examples of the electrophotographic photosensitive member include a single-layer electrophotographic photosensitive member and a multi-layer electrophotographic photosensitive member. The single-layer electrophotographic photosensitive member includes a single-layer photosensitive layer having a charge generating function and a charge transporting function. The multi-layer electrophotographic photosensitive member includes a photosensitive layer including a charge generating layer having a charge generating function and a charge transport layer having a charge transporting function.

For example, an electrophotographic photosensitive member is known that includes a surface layer containing a polyarylate resin obtained from a divalent carboxylic acid component and a divalent phenol component and represented by the following formula.

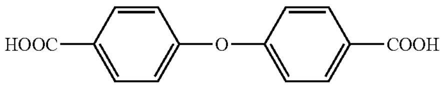 [SMILES: O=C(O)c1ccc(Oc2ccc(C(=O)O)cc2)cc1]

SUMMARY

An electrophotographic photosensitive member according to an aspect of the present disclosure includes a conductive substrate and a photosensitive layer. The photosensitive layer is a single layer. The photosensitive layer contains a charge generating material, a hole transport material, an electron transport material, and a binder resin. The binder resin includes a polyarylate resin. The polyarylate resin includes repeating units represented by formulas (1), (2), (3), and (4). A percentage of the number of repeats of the repeating unit represented by the formula (3) relative to a total of the number of repeats of the repeating unit represented by the formula (1) and the number of repeats of the repeating unit represented by formula (3) is greater than 0% and less than 20%.

(1)

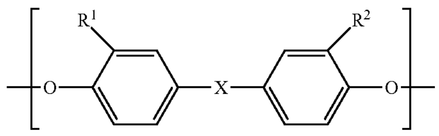

-continued (2)

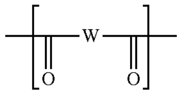

(3)

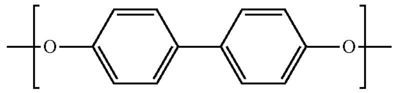

(4)

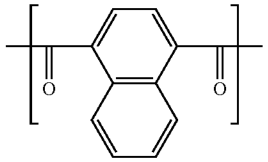

In the formula (1), $R^1$ and $R^2$ each represent, independently of one another, a hydrogen atom or a methyl group and X represents a divalent group represented by formula (X1) or (X2). In the formula (2), W represents a divalent group represented by formula (W1) or (W2).

(X1)

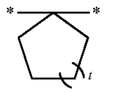

(X2)

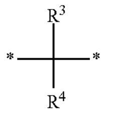

In the formula (X1), t represents an integer of at least 1 and no greater than 3 and * represents a bond. In the formula (X2), $R^3$ and $R^4$ each represent a hydrogen atom or an alkyl group with a carbon number of at least 1 and no greater than 4, $R^3$ and $R^4$ represent chemical groups different from each other, and * represents a bond.

(W1)

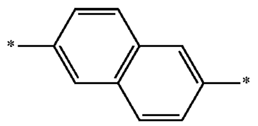

(W2)

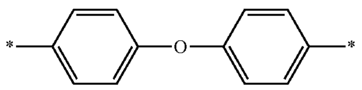

In the formulas (W1) and (W2), * represents a bond.

A process cartridge according to another aspect of the present disclosure includes the above-described electrophotographic photosensitive member and at least one selected from the group consisting of a charger, a light exposure device, a development device, a transfer device, a cleaner, and a static eliminator.

An image forming apparatus according to still another aspect of the present disclosure includes an image bearing member, a charger that charges a surface of the image bearing member, a light exposure device that exposes the charged surface of the image bearing member to light to form an electrostatic latent image on the surface of the image bearing member, a development device that develops the electrostatic latent image into a toner image by supplying toner to the surface of the image bearing member, and a transfer device that transfers the toner image from the image bearing member to a transfer target. The image bearing member is the above-described electrophotographic photosensitive member.

DETAILED DESCRIPTION

Figure 1:
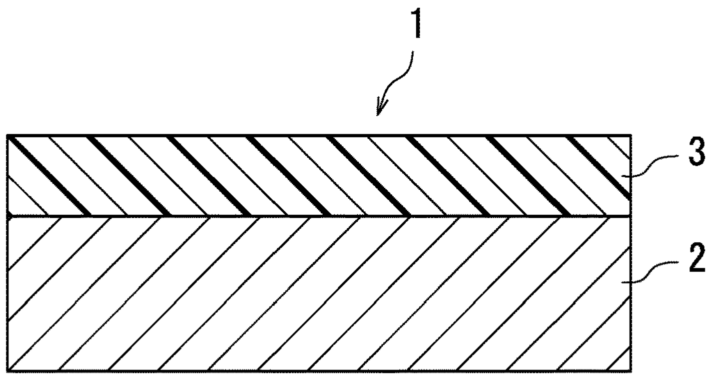
FIG. 1 is a partial cross-sectional view of an example of an electrophotographic photosensitive member according to a first embodiment of the present disclosure.

The following describes embodiments of the present disclosure in detail. Note that the present disclosure is not limited to any of the following embodiments and can be practiced within a scope of objects of the present disclosure with alterations made as appropriate. Although some overlapping explanations may be omitted as appropriate, such omission does not limit the gist of the present disclosure. In the following description, the term "-based" may be appended to the name of a chemical compound to form a generic name encompassing both the chemical compound itself and derivatives thereof. When the term "-based" is appended to the name of a chemical compound to represent the name of a polymer, the term indicates that a repeating unit of the polymer originates from the chemical compound or a derivative thereof. Furthermore, "general formulas" and "chemical formulas" are each generally referred to as "formula". The words "each represent, independently of one another" in description of formulas mean representing the same group as or different groups from each other. Any one type of each component described in the present specification may be used independently or any two or more types of the component may be used in combination unless otherwise stated.

First of all, substituents used in the present specification will be described. Examples of a halogen atom (halogen group) include a fluorine atom (fluoro group), a chlorine atom (chloro group), a bromine atom (bromo group), and an iodine atom (iodine group).

Unless otherwise stated, an alkyl group with a carbon number of at least 1 and no greater than 6, an alkyl group with a carbon number of at least 1 and no greater than 5, an alkyl group with a carbon number of at least 1 and no greater than 4, an alkyl group with a carbon number of at least 1 and no greater than 3, and an alkyl group with a carbon number of 3 each are an unsubstituted straight chain or branched chain alkyl group. Examples of the alkyl group with a carbon number of at least 1 and no greater than 6 include a methyl group, an ethyl group, an n-propyl group, an isopropyl group, an n-butyl group, a sec-butyl group, a tert-butyl group, an n-pentyl group, a 1-methylbutyl group, a 2-methylbutyl group, a 3-methylbutyl group, a 1-ethylpropyl group, a 2-ethylpropyl group, a 1,1-dimethylpropyl group, a 1,2-dimethylpropyl group, a 2,2-dimethylpropyl group, an n-hexyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 3,3-dimethylbutyl group, a 1,1,2-trimethylpropyl group, a 1,2,2-trimethylpropyl group, a 1-ethylbutyl group, a 2-ethylbutyl group, and a 3-ethylbutyl group. Examples of the alkyl group with a carbon number of at least 1 and no greater than 5, the alkyl group with a carbon number of at least 1 and no greater than 4, the alkyl group with a carbon number of at least 1 and no greater than 3, and the alkyl group with a carbon number of 3 are groups with corresponding carbon numbers among the groups listed as the examples of the alkyl group with a carbon number of at least 1 and no greater than 6.

A perfluoroalkyl group with a carbon number of at least 1 and no greater than 10, a perfluoroalkyl group with a carbon number of at least 3 and no greater than 10, a perfluoroalkyl group with a carbon number of at least 5 and no greater than 7, and a perfluoroalkyl group with a carbon number of 6 each are an unsubstituted straight chain or branched chain perfluoroalkyl group unless otherwise stated. Examples of the perfluoroalkyl group with a carbon number of at least 1 and no greater than 10 include a trifluoromethyl group, a perfluoroethyl group, a perfluoro-n-propyl group, a perfluoroisopropyl group, a perfluoro-n-butyl group, a perfluoro-sec-butyl group, a perfluoro-tert-butyl group, a perfluoro-n-pentyl group, a perfluoro-1-methylbutyl group, a perfluoro-2-methylbutyl group, a perfluoro-3-methylbutyl group, a perfluoro-1-ethylpropyl group, a perfluoro-2-ethylpropyl group, a perfluoro-1,1-dimethylpropyl group, a perfluoro-1,2-dimethylpropyl group, a perfluoro-2,2-dimethylpropyl group, a perfluoro-n-hexyl group, a perfluoro-1-methylpentyl group, a perfluoro-2-methylpentyl group, a perfluoro-3-methylpentyl group, a perfluoro-4-methylpentyl group, a perfluoro-1,1-dimethylbutyl group, a perfluoro-1,2-dimethylbutyl group, a perfluoro-1,3-dimethylbutyl group, a perfluoro-2,2-dimethylbutyl group, a perfluoro-2,3-dimethylbutyl group, a perfluoro-3,3-dimethylbutyl group, a perfluoro-1,1,2-trimethylpropyl group, a perfluoro-1,2,2-trimethylpropyl group, a perfluoro-1-ethylbutyl group, a perfluoro-2-ethylbutyl group, a perfluoro-3-ethylbutyl group, a straight chain or branched chain perfluoroheptyl group, a straight chain or branched chain perfluorooctyl group, a straight chain or branched chain perfluorononyl group, and a straight chain or branched chain perfluorodecyl group. Examples of the perfluoroalkyl group with a carbon number of at least 3 and no greater than 10, the perfluoroalkyl group with a carbon number of at least 5 and no greater than 7, and the perfluoroalkyl group with a carbon number of 6 are groups with corresponding carbon numbers among the groups listed as the examples of the perfluoroalkyl group with a carbon number of at least 1 and no greater than 10.

An alkanediyl group with a carbon number of at least 1 and no greater than 6 and an alkanediyl group with a carbon number of at least 1 and no greater than 3 each are an unsubstituted straight chain or branched chain alkanediyl group unless otherwise stated. Examples of the alkanediyl group with a carbon number of at least 1 and no greater than 6 include a methanediyl group (methylene group), an ethanediyl group, an n-propanediyl group, an isopropanediyl group, an n-butanediyl group, a sec-butanediyl group, a tert-butanediyl group, an n-pentanediyl group, a 1-methylbutanediyl group, a 2-methylbutanediyl group, a 3-methylbutanediyl group, a 1-ethylpropanediyl group, a 2-ethylpropanediyl group, a 1,1-dimethylpropanediyl group, a 1,2-dimethylpropanediyl group, a 2,2-dimethylpropanediyl group, an n-hexanediyl group, a 1-methylpentanediyl group, a 2-methylpentanediyl group, a 3-methylpentanediyl group, a 4-methylpentanediyl group, a 1,1-dimethylbutanediyl group, a 1,2-dimethylbutanediyl group, a 1,3-dimethylbutanediyl group, a 2,2-dimethylbutanediyl group, a 2,3-dimethylbutanediyl group, a 3,3-dimethylbutanediyl group, a 1,1,2-trimethylpropanediyl group, a 1,2,2-trimethylpropanediyl group, a 1-ethylbutanediyl group, a 2-ethylbutanediyl group, and a 3-ethylbutandiyl group. Examples of the alkanediyl group with a carbon number of at least 1 and no greater than 3 are groups with corresponding carbon numbers among the groups listed as the examples of the alkanediyl group with a carbon number of at least 1 and no greater than 6.

An alkoxy group with a carbon number of at least 1 and no greater than 6 and an alkoxy group with a carbon number of at least 1 and no greater than 3 each are an unsubstituted straight chain or branched chain alkoxy group unless otherwise stated. Examples of the alkoxy group with a carbon number of at least 1 and no greater than 6 include a methoxy group, an ethoxy group, an n-propoxy group, an isopropoxy group, an n-butoxy group, a sec-butoxy group, a tert-butoxy group, an n-pentoxy group, a 1-methylbutoxy group, a 2-methylbutoxy group, a 3-methylbutoxy group, a 1-ethylpropoxy group, a 2-ethylpropoxy group, a 1,1-dimethylpropoxy group, a 1,2-dimethylpropoxy group, a 2,2-dimethylpropoxy group, an n-hexyloxy group, a 1-methylpentyloxy group, a 2-methylpentyloxy group, a 3-methylpentyloxy group, a 4-methylpentyloxy group, a 1,1-dimethylbutoxy group, a 1,2-dimethylbutoxy group, a 1,3-dimethylbutoxy group, a 2,2-dimethylbutoxy group, a 2,3-dimethylbutoxy group, a 3,3-dimethylbutoxy group, a 1,1,2-trimethylpropoxy group, a 1,2,2-trimethylpropoxy group, a 1-ethylbutoxy group, a 2-ethylbutoxy group, and a 3-ethylbutoxy group. Examples of the alkoxy group with a carbon number of at least 1 and no greater than 3 are groups with a carbon number of at least 1 and no greater than 3 among the groups listed as the examples of the alkoxy group with a carbon number of at least 1 and no greater than 6.

An alkenyl group with a carbon number of at least 2 and no greater than 6 is an unsubstituted straight chain or branched chain alkenyl group unless otherwise stated. The alkenyl group with a carbon number of at least 2 and no greater than 6 has at least 1 and no greater than 3 double bonds. Examples of the alkenyl group with a carbon number of at least 2 and no greater than 6 include an ethenyl group, a propenyl group, a butenyl group, a butadienyl group, a pentenyl group, a hexenyl group, a hexadienyl group, and a hexatrinyl group.

An aryl group with a carbon number of at least 6 and no greater than 14 and an aryl group with a carbon number of at least 6 and no greater than 10 each are an unsubstituted aryl group unless otherwise stated. Examples of the aryl group with a carbon number of at least 6 and no greater than 14 include a phenyl group, a naphthyl group, an indacenyl group, a biphenylenyl group, an acenaphthylenyl group, an anthryl group, and a phenanthryl group. Examples of the aryl group with a carbon number of at least 6 and no greater than 10 include a phenyl group and a naphthyl group. The substituents used in the present specification have been described so far.

First Embodiment: Electrophotographic Photosensitive Member

Figure 2:
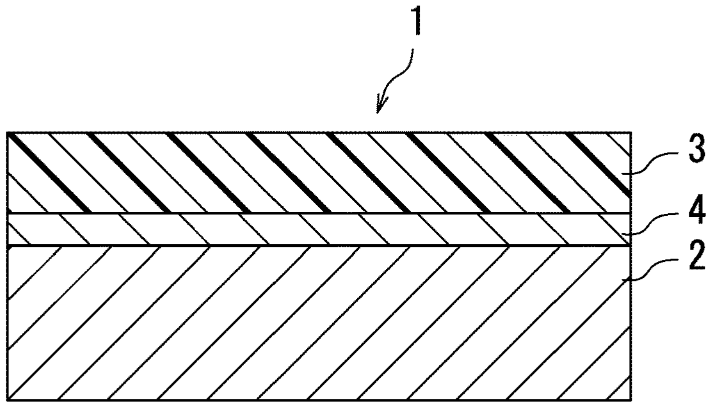
FIG. 2 is a partial cross-sectional view of another example of the electrophotographic photosensitive member according to the first embodiment of the present disclosure.
Figure 3:
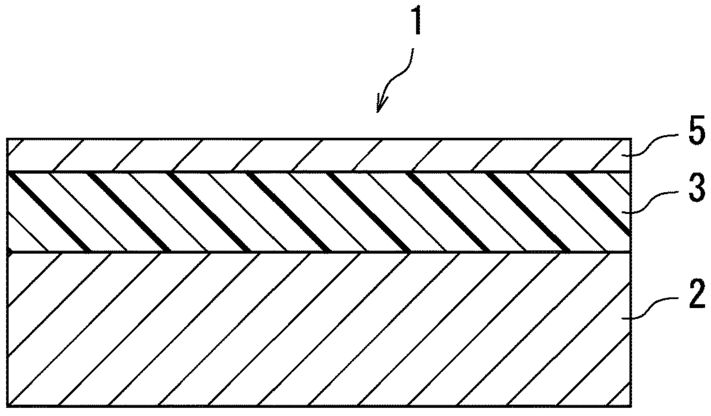
FIG. 3 is a partial cross-sectional view of still another example of the electrophotographic photosensitive member according to the first embodiment of the present disclosure.

A first embodiment relates to an electrophotographic photosensitive member (also referred to below as a photosensitive member). With reference to FIGS. 1 to 3, the configuration of the electrophotographic photosensitive member according to the first embodiment of the present disclosure will be described below. FIGS. 1 to 3 each are a partial cross-sectional view of an example of a photosensitive member 1.

As illustrated in FIG. 1, the photosensitive member 1 includes a conductive substrate 2 and a photosensitive layer 3, for example. The photosensitive layer 3 is a single-layer. The photosensitive member 1 is a single-layer electrophotographic photosensitive member including a photosensitive layer 3 of a single layer.

As illustrated in FIG. 2, the photosensitive member 1 may further include an intermediate layer 4 (undercoat layer) in addition to the conductive substrate 2 and the photosensitive layer 3. The intermediate layer 4 is disposed between the conductive substrate 2 and the photosensitive layer 3. As illustrated in FIG. 1, the photosensitive layer 3 may be disposed directly on the conductive substrate 2. Alternatively, as illustrated in FIG. 2, the photosensitive layer 3 may be disposed on the conductive substrate 2 with the intermediate layer 4 therebetween.

As illustrated in FIG. 3, the photosensitive member 1 may further include a protective layer 5 in addition to the conductive substrate 2 and the photosensitive layer 3. The protective layer 5 is disposed on the photosensitive layer 3. As illustrated in FIG. 3, the protective layer 5 may be provided as an outermost layer of the photosensitive member 1. However, the photosensitive layer 3 is preferably provided as an outermost layer of the photosensitive member 1 as illustrated in FIGS. 1 and 2. As a result of the photosensitive layer 3 being provided as an outermost surface layer containing a later-described polyarylate resin (PA), abrasion resistance, filming resistance, and scratch resistance of the photosensitive member 1 can be increased.

Although no particular limitations are placed on the thickness of the photosensitive layer 3, the photosensitive layer 3 has a thickness of preferably at least 5 μm and no greater than 100 μm, and more preferably at least 10 μm and no greater than 50 μm. The configuration of the photosensitive member 1 has been described so far with reference to FIGS. 1 to 3.

The following further describes the photosensitive member. The photosensitive layer of the photosensitive member contains a charge generating material, a hole transport material, an electron transport material, and a binder resin. Preferably, the photosensitive layer further contains resin particles. The photosensitive layer may further contain an additive as necessary.

(Charge Generating Material)

Examples of the charge generating material include a phthalocyanine pigment, a perylene-based pigment, a bisazo pigment, a tris-azo pigment, a dithioketopyrrolopyrrole pigment, a metal-free naphthalocyanine compound, a metal naphthalocyanine compound, a squaraine pigment, an indigo pigment, an azulenium pigment, a cyanine pigment, powders of inorganic photoconductive materials (e.g., selenium, selenium-tellurium, selenium-arsenic, cadmium sulfide, and amorphous silicon), a pyrylium pigment, an anthanthrone-based pigment, a triphenylmethane-based pigment, a threne-based pigment, a toluidine-based pigment, a pyrazoline-based pigment, and a quinacridone-based pigment. The photosensitive layer may contain one charge generating material or contain two or more charge generating materials.

The phthalocyanine pigment is a pigment with phthalocyanine structure. Examples of the phthalocyanine pigment include metal phthalocyanine and metal-free phthalocyanine. Examples of the metal phthalocyanine include titanyl phthalocyanine, hydroxygallium phthalocyanine, and chlorogallium phthalocyanine. A preferable metal phthalocyanine is titanyl phthalocyanine. Titanyl phthalocyanine is represented by formula (CG-1). Metal-free phthalocyanine is represented by formula (CG-2).

(CG-1)

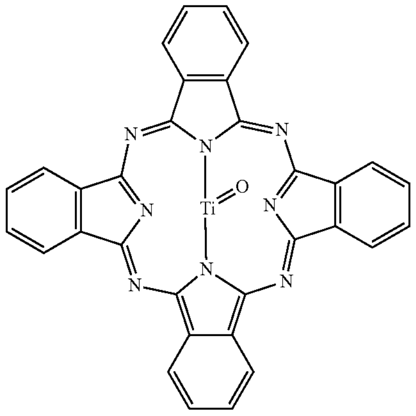

(CG-2)

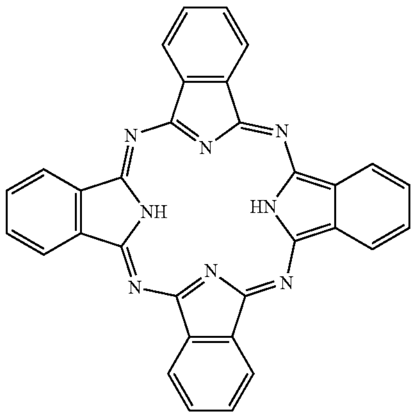

The phthalocyanine pigment may be crystalline or noncrystalline. Examples of crystalline metal-free phthalocyanine include metal-free phthalocyanine with X-form crystal structure (also referred to below as X-form metal-free phthalocyanine). Examples of crystalline titanyl phthalocyanine include titanyl phthalocyanine with any of α-form crystal structure, β-form crystal structure, and Y-form crystal structure (also referred to below, as α-from titanyl phthalocyanine, β-form titanyl phthalocyanine, and Y-form titanyl phthalocyanine, respectively).

For example, in a digital optical image forming apparatus (e.g., a laser beam printer or facsimile machine that uses a light source such as a semiconductor laser), a photosensitive member that is sensitive to light in a wavelengths range of at least 700 nm is preferably used. In terms of high quantum yield in a wavelength range of at least 700 nm, the charge generating material is preferably a phthalocyanine pigment, more preferably metal-free phthalocyanine or titanyl phthalocyanine, further preferably titanyl phthalocyanine, and particularly preferably Y-form titanyl phthalocyanine.

Y-form titanyl phthalocyanine exhibits a main peak for example at a Bragg angle (2θ±0.2°) of 27.20° in a CuKα characteristic X-ray diffraction spectrum. The term main peak in the CuKα characteristic X-ray diffraction spectrum refers to a most intense or second most intense peak within a range of Bragg angles (2θ±0.2°) from 3° to 40°. Y-form titanyl phthalocyanine has no peaks at 26.2° in the CuKα characteristic X-ray diffraction spectrum.

The CuKα characteristic X-ray diffraction spectrum can be measured by the following method, for example. A sample (titanyl phthalocyanine) is loaded into a sample holder of an X-ray diffraction spectrometer (e.g., "RINT (registered Japanese trademark) 1100", product of Rigaku Corporation) and an X-ray diffraction spectrum is plotted under conditions of use of a Cu X-ray tube, a tube voltage of 40 kV a tube current of 30 mA, and CuKα characteristic X-rays with a wavelength of 1.542 Å. The measurement range (2θ) is for example from 3° to 40° (start angle: 3°, stop angle: 40°), and the scanning speed is for example 10°/min. A main peak in the plotted X-ray diffraction spectrum is determined, and a Bragg angle of the main peak is read from the X-ray diffraction spectrum.

The content ratio of the charge generating material is preferably at least 0.1 parts by mass and no greater than 50 parts by mass relative to 100 parts by mass of the binder resin, and more preferably at least 0.5 parts by mass and no greater than 5 parts by mass.

(Binder Resin)

The binder resin includes a polyarylate resin. The polyarylate resin includes repeating units represented by formulas (1), (2), (3), and (4). A percentage of the number of repeats of the repeating unit represented by the formula (3) relative to the total of the number of repeats of the repeating unit represented by the formula (1) and the number of repeats of the repeating unit represented by formula (3) is greater than 0% and less than 20%.

(1)

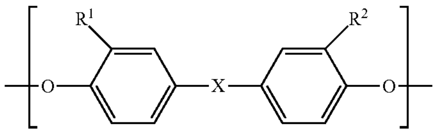

(2)

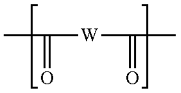

(3)

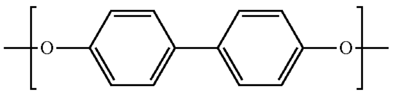

(4)

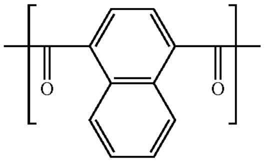

In formula (1), $R^1$ and $R^2$ each represent, independently of one another, a hydrogen atom or a methyl group and X represents a divalent group represented by formula (X1) or (X2). In formula (2), W represents a divalent group represented by formula (W1) or (W2).

(X1)

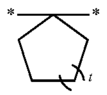

(X2)

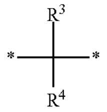

In formula (X1), t represents an integer of at least 1 and no greater than 3 and * represents a bond. In formula (X2), $R^3$ and $R^4$ each represent a hydrogen atom or an alkyl group with a carbon number of at least 1 and no greater than 4, $R^3$ and $R^4$ represent chemical groups different from each other, and * represents a bond.

(W1)

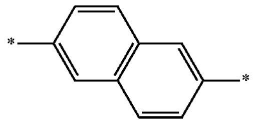

(W2)

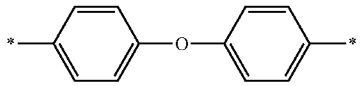

In formulas (W1) and (W2), * represents a bond.

In the following, the repeating units represented by formulas (1), (2), (3), and (4) may be referred to as "repeating units (1), (2), (3), and (4)", respectively. The percentage of the number of repeats of the repeating unit (3) relative to the total of the number of repeats of the repeating unit (1) and the number of repeats of the repeating unit (3) may be referred to as "percentage (3)". Also, a polyarylate resin including the repeating units (1), (2), (3), and (4) with a percentage (3) of greater than 0% and less than 20% may be referred to as "polyarylate resin (PA)".

The polyarylate resin (PA) essentially includes the repeating units (1), (2), (3), and (4). As a result of including such repeating units, the polyarylate resin (PA) is excellent in solubility in a solvent and increases abrasion resistance of a photosensitive member including a photosensitive layer containing the polyarylate resin (PA). As a result of including both the repeating units (3) and (4), the polyarylate resin (PA) can increase scratch resistance of a photosensitive layer containing the polyarylate resin (PA). Accordingly, scratches on the photosensitive layer are less likely to be made. As such, filming resulting from toner getting into scratches can be inhibited.

The percentage (3) is a percentage (i.e., $100\times N_3/(N_1+N_3)$) of the number $N_3$ of repeats of the repeating unit (3) relative to the total of the number $N_1$ of repeats of the repeating unit (1) and the number $N_3$ of repeats of the repeating unit (3) in the polyarylate resin (PA). As a result of the percentage (3) being less than 20%, the polyarylate resin (PA) has increased solubility in a solvent. The percentage (3) is greater than 0%, that is, the percentage (3) is not 0%. Accordingly, a photosensitive member including a photosensitive layer containing the polyarylate resin (PA) can have increased abrasion resistance. The percentage (3) is preferably at least 1%, and more preferably at least 5%. By contrast, the percentage (3) is preferably no greater than 19%, and more preferably no greater than 10%.

A percentage of the number of repeats of the repeating unit (4) relative to the total of the number of repeats of the repeating unit (2) and the number of repeats of the repeating unit (4) is greater than 0% and less than 100%. The percentage of the number of repeats of the repeating unit (4) relative to the total of the number of repeats of the repeating unit (2) and the number of repeats of the repeating unit (4) may be referred to as "percentage (4)". The percentage (4) is a percentage (i.e., $100\times N_4/(N_2+N_4)$) of the number $N_4$ of repeats of the repeating unit (4) relative to the total of the number $N_2$ of repeats of the repeating unit (2) and the number $N_4$ of repeats of the repeating unit (4) in the polyarylate resin (PA). The percentage (4) is greater than 0%, that is, the percentage (4) is not 0%. Accordingly, the polyarylate resin (PA) includes the repeating unit (4). As a result of including the repeating unit (4), the polyarylate resin (PA) has increased solubility in a solvent and increases abrasion resistance of a photosensitive member including a photosensitive layer containing the polyarylate resin (PA). By contrast, the percentage (4) is less than 100%, that is, the percentage (4) is not 100%. Accordingly, the polyarylate resin (PA) includes the repeating unit (2). As a result of the polyarylate resin (PA) including the repeating unit (2), a photosensitive member including a photosensitive layer containing the polyarylate resin (PA) can have increased abrasion resistance. The percentage (4) is preferably at least 1%, more preferably at least 10%, and further preferably at least 35%. By contrast, the percentage (4) is preferably no greater than 99%, more preferably no greater than 80%, and further preferably no greater than 65%.

Each of the percentages (3) and (4) can be calculated from the ratio of a peak unique to a corresponding repeating unit in a $^1$H-NMR spectrum of the polyarylate resin (PA) plotted using a proton nuclear magnetic resonance spectrometer.

In formula (1), each of $R^1$ and $R^2$ preferably represents a methyl group.

In formula (X1), t preferably represents 2.

In formula (X2), it is preferable that: $R^3$ represents a hydrogen atom and $R^4$ represents a methyl group, an ethyl group, or an alkyl group with a carbon number of 3; $R^3$ represents a methyl group and $R^4$ represents an ethyl group or an alkyl group with a carbon number of 3; or $R^3$ represents an ethyl group and $R^4$ represents an alkyl group with a carbon number of 3. It is more preferable that $R^3$ represents a methyl group and $R^4$ represents an ethyl group.

The bond that is represented by * in formulas (X1) and (X2) is bonded to a carbon atom to which X in formula (1) is bonded. The bond that is represented by * in formulas (W1) and (W2) is bonded to a carbon atom to which W in formula (2) is bonded.

Examples of the repeating unit (1) include repeating units represented by formulas (1-1), (1-2), and (1-3) (also referred to below as repeating units (1-1), (1-2), and (1-3), respectively).

(1-1)

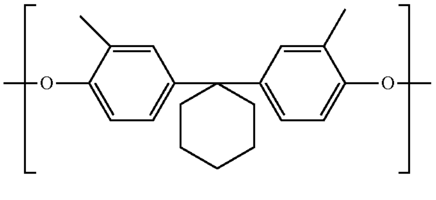

-continued (1-2)

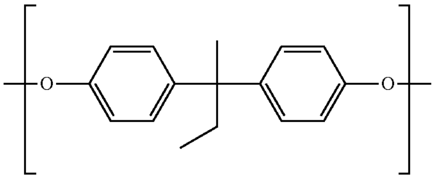

(1-3)

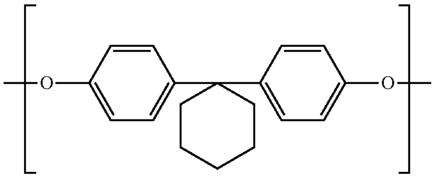

The repeating unit (2) is a repeating unit represented by formula (2-1) or (2-2) (also referred to below as repeating units (2-1) and (2-2), respectively).

(2-1)

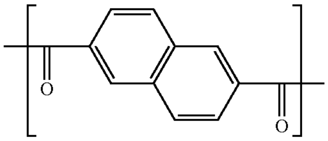

(2-2)

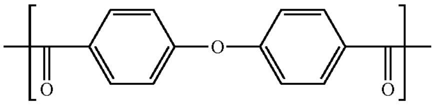

In one preferable example, in formula (1), $R^1$ and $R^2$ each represent a methyl group and X represents a divalent group represented by formula (X1). It is more preferable that the repeating unit (1) is the repeating unit (1-1). It is further preferable that: the repeating unit (1) is the repeating unit (1-1) and the repeating unit (2) is the repeating unit (2-1); or the repeating unit (1) is the repeating unit (1-1) and the repeating unit (2) is the repeating unit (2-2).

In another preferable example, in formula (1), $R^1$ and $R^2$ each represent a hydrogen atom and X represents a divalent group represented by formula (X2). It is more preferable that the repeating unit (1) is the repeating unit (1-2). It is further preferable that: the repeating unit (1) is the repeating unit (1-2) and the repeating unit (2) is the repeating unit (2-1); or the repeating unit (1) is the repeating unit (1-2) and the repeating unit (2) is the repeating unit (2-2). As a result of a photosensitive layer containing the polyarylate resin (PA) described in the other preferable example, a photosensitive member including the photosensitive layer can have further increased abrasion resistance.

The polyarylate resin (PA) may have an end group. Examples of the end group of the polyarylate resin (PA) include end groups represented by formulas (T-1) and (T-2) A preferable end group represented by formula (T-1) is an end group represented by formula (T-DMP) (also referred to below as end group (T-DMP)). A preferable end group represented by formula (T-2) is an end group represented by formula (T-PFH) (also referred to below as end group (T-PFH)).

(T-1)

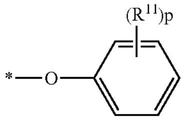

(T-2)

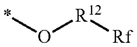

(T-DMP)

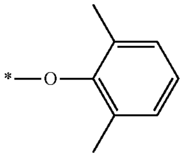

(T-PFH)

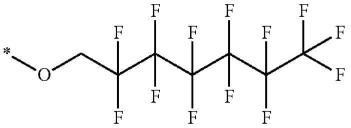

In formula (T-1), $R^{11}$ represents a halogen atom or an alkyl group with a carbon number of at least 1 and no greater than 6 and p represents an integer of at least 0 and no greater than 5. $R^{11}$ preferably represents an alkyl group with a carbon number of at least 1 and no greater than 6, more preferably represents an alkyl group with a carbon number of at least 1 and no greater than 3, and further preferably represents a methyl group. p preferably represents an integer of at least 1 and no greater than 3, and more preferably represents 2.

In formula (T-2), $R^{12}$ represents an alkanediyl group with a carbon number of at least 1 and no greater than 6 and Rf represents a perfluoroalkyl group with a carbon number of at least 1 and no greater than 10. $R^{12}$ preferably represents an alkanediyl group with a carbon number of at least 1 and no greater than 3, and more preferably represents a methylene group. Rf preferably represents a perfluoroalkyl group with a carbon number of at least 3 and no greater than 10, more preferably represents a perfluoroalkyl group with a carbon number of at least 5 and no greater than 7, and further preferably represents a perfluoroalkyl group with a carbon number of 6.

In formulas (T-1), (T-2), (T-DMP), and (T-PFH), * represents a bond. The bond that is represented by * in formulas (T-1), (T-2). (T-DMP), and (T-PFH) is bonded to a repeating unit (specifically, the repeating unit (2) or (4)) derived from dicarboxylic acid located at an end of the polyarylate resin (PA).

Preferable examples of the polyarylate resin (PA) include polyarylate resins (PA-1) to (PA-4) shown in Table 1. Each of the polyarylate resins (PA-1) to (PA-4) includes repeating units shown in Table 1 as the repeating units (1) to (4). Units (1) to (4) in Table 1 and later described Table 2 represent the repeating units (1) to (4), respectively.

TABLE 1

| Polyarylate resin | Unit (1) | Unit (2) | Unit (3) | Unit (4) |
|---|---|---|---|---|
| PA-1 | 1-1 | 2-1 | 3 | 4 |
| PA-2 | 1-2 | 2-1 | 3 | 4 |
| PA-3 | 1-1 | 2-2 | 3 | 4 |
| PA-4 | 1-2 | 2-2 | 3 | 4 |

Further preferable examples of the polyarylate resin (PA) include polyarylate resins (PA-a) to (PA-h) shown in Table 2. The polyarylate resins (PA-a) to (PA-h) each have an end group shown in Table 2 and each include repeating units shown in Table 2 as the repeating units (1) to (4).

TABLE 2

| Polyarylate resin | Unit (1) | Unit (2) | Unit (3) | Unit (4) | End group |
|---|---|---|---|---|---|
| PA-a | 1-1 | 2-1 | 3 | 4 | T-DMP |
| PA-b | 1-2 | 2-1 | 3 | 4 | T-DMP |
| PA-c | 1-1 | 2-2 | 3 | 4 | T-DMP |
| PA-d | 1-2 | 2-2 | 3 | 4 | T-DMP |
| PA-e | 1-1 | 2-1 | 3 | 4 | T-PFH |
| PA-f | 1-2 | 2-1 | 3 | 4 | T-PFH |
| PA-g | 1-1 | 2-2 | 3 | 4 | T-PFH |
| PA-h | 1-2 | 2-2 | 3 | 4 | T-PFH |

In the polyarylate resin (PA), a repeating unit (specifically, the repeating unit (1) or (3)) derived from bisphenol and a repeating unit (specifically, the repeating unit (2) or (4)) derived from dicarboxylic acid are adjacent and bonded to each other That is, the repeating unit (1) may be bonded to the repeating unit (2) or bonded to the repeating unit (4). Also, the repeating unit (3) may be bonded to the repeating unit (2) or bonded to the repeating unit (4). The number of repeats of the repeating units derived from bisphenols and the number of repeats of the repeating units derived from dicarboxylic acids are substantially equal to each other and satisfy a calculation formula "number of repeats of repeating units derived from dicarboxylic acids=number of repeats of repeating units derived from bisphenols+1". The polyarylate resin (PA) may be a random copolymer, an alternating copolymer, a periodic copolymer, or a block copolymer, for example.

The polyarylate resin (PA) may include as the repeating unit (1) only one repeating unit (1) or two or more (e.g., two) repeating units (1). The polyarylate resin (PA) may include as the repeating unit (2) only one repeating unit (2) or may include two repeating units (2).

The polyarylate resin (PA) may further include a repeating unit other than the repeating units (1) to (4) as a repeating unit. However, in order to increase solubility in a solvent and increase abrasion resistance of a photosensitive member including a photosensitive layer containing the polyarylate resin (PA), the percentage of the total of the numbers of repeats of the repeating units (1) to (4) relative to the total of the numbers of repeats of all repeating units included in the polyarylate resin (PA) is preferably at least 90%, more preferably at least 95%, and further preferably at least 99%, and particularly preferably 100%. That is, the polyarylate resin (PA) particularly preferably includes only the repeating units (1) to (4) each as a repeating unit.

In order to increase solubility in a solvent, the percentage of the number of repeats of the repeating unit (3) relative to the total of the numbers of repeats of the repeating units derived from bisphenols of the polyarylate resin (PA) is preferably no greater than 20%, and more preferably less than 20%.

The polyarylate resin (PA) has a viscosity average molecular weight of preferably at least 10,000, more preferably at least 30,000, further preferably at least 50,000, and particularly preferably at least 55,000. As a result of the viscosity average molecular weight of the polyarylate resin (PA) being set to at least 10,000, a photosensitive member including a photosensitive layer containing the polyarylate resin (PA) can have increased abrasion resistance. By contrast, the polyarylate resin (PA) has a viscosity average molecular weight of preferably no greater than 80,000, more preferably no greater than 70,000, and further preferably no greater than 60,000. As a result of the viscosity average molecular weight of the polyarylate resin (PA) being set to no greater than 80,000, the polyarylate resin (PA) can have increased solubility in a solvent. The viscosity average molecular weight of the polyarylate resin (PA) is measured in accordance with the Japanese Industrial Standards (JTS) K7252-1:2016.

A production method of the polyarylate resin (PA) will be described next. An example of the production method of the polyarylate resin (PA) is condensation polymerization of bisphenols for forming bisphenol-derived repeating units and dicarboxylic acids for forming dicarboxylic acid-derived repeating units. Any known synthesis method (e.g., solution polymerization, melt polymerization, or interface polymerization) can be employed as condensation polymerization.

Examples of the bisphenols for forming the bisphenol-derived repeating units include compounds represented by formulas (BP-1) and (BP-3) (also referred to below as compounds (BP-1) and (BP-3), respectively). Examples of the dicarboxylic acids for forming the dicarboxylic acid-derived repeating units include compounds represented by formulas (DC-2) and (DC-4) (also referred to below as compounds (DC-2) and (CD-4), respectively). In formula (BP-1), $R^1$, $R^2$, and X are the same as defined for $R^1$, $R^2$, and X in formula (1), respectively. W in formula (DC-2) is the same as defined for W in formula (2).

(BP-1)

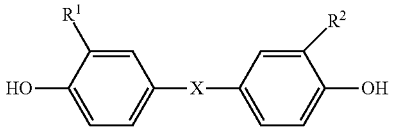

(DC-2)

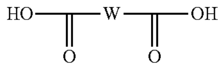

(BP-3)

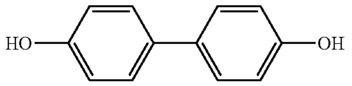

(DC-4)

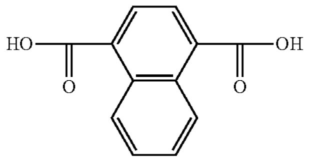

A percentage of the amount (unit: mol) of the compound (BP-3) relative to the total amount (unit: mol) of the compounds (BP-1) and (BP-3) in production of the polyarylate resin (PA) corresponds to the percentage (3). Also, a percentage of the amount (unit: mol) of the compound (DC-4) relative to the total amount (unit: mol) of the compounds (DC-2) and (DC-4) corresponds to the percentage (4).

The bisphenols may each be derivatized to an aromatic diacetate for use. The dicarboxylic acids may each be derivatized for use. Examples of derivatives of the dicarboxylic acids include dicarboxylic acid dichloride, dicarboxylic acid dimethyl ester, dicarboxylic acid diethyl ester, and dicarboxylic acid anhydride. Dicarboxylic acid dichloride is a compound in which two "—C(═O)—OH" groups of dicarboxylic acid have each been replaced by a "—C(═O)—Cl" group.

A terminator may be added in condensation polymerization of bisphenols and dicarboxylic acids. Examples of the terminator include 2,6-dimethylphenol and 1H,1H-perfluoro-1-heptanol. Use of 2,6-dimethylphenol as a terminator can form the end group (T-DMP). Use of 1H,1H-perfluoro-1-heptanol as a terminator can form the end group (T-PFH).

Either or both a base and a catalyst may be added in condensation polymerization of bisphenols and dicarboxylic acids. An example of the base is sodium hydroxide. Examples of the catalyst include benzyltributylammonium chloride, ammonium chloride, ammonium bromide, quaternary ammonium salt, triethylamine, and trimethylamine.

The photosensitive layer may contain as the binder resin only one polyarylate resin (PA) or may contain two or more polyarylate resins (PA). Furthermore, the photosensitive layer may contain as the binder resin only the polyarylate resin (PA) or may further contain a binder resin (also referred to below as additional binder resin) other than the polyarylate resin (PA). Examples of the additional binder resin include thermoplastic resins (specific examples include polyarylate resins other than the polyarylate resin (PA), polycarbonate resins, styrene-based resins, styrene-butadiene copolymers, styrene-acrylonitrile copolymers, styrene-maleic acid copolymers, styrene-acrylic acid copolymers, acryl copolymers, polyethylene resins, ethylene-vinyl acetate copolymers, chlorinated polyethylene resins, polyvinyl chloride resins, polypropylene resins, ionomers, vinyl chloride-vinyl acetate copolymers, polyester resins, alkyd resins, polyamide resins, polyurethane resins, polysulfone resins, diallyl phthalate resins, ketone resins, polyvinyl butyral resins, polyvinyl acetal resins, and polyether resins), thermosetting resins (specific examples include silicone resins, epoxy resins, phenolic resins, urea resins, melamine resins, and crosslinkable thermosetting resins other than these), and photocurable resins (specific example include epoxy-acrylic acid-based resins and urethane-acrylic acid-based copolymers).

(Electron Transport Material)

Examples of the electron transport material include quinone-based compounds, diimide-based compounds, hydrazone-based compounds, malononitrile-based compounds, thiopyran-based compounds, trinitrothioxanthone-based compounds, 3,4,5,7-tetranitro-9-fluorenone-based compounds, dinitroanthracene-based compounds, dinitroacridine-based compounds, tetracyanoethylene, 2,4,8-trinitrothioxanthone, dinitrobenzene, dinitroacridine, succinic anhydride, maleic anhydride, and dibromomaleic anhydride. Examples of the quinone-based compounds include diphenoquinone-based compounds, azoquinone-based compounds, anthraquinone-based compounds, naphthoquinone-based compounds, nitroanthraquinone-based compounds, and dinitroanthraquinone-based compounds.

Preferable examples of the electron transport material to favorably form the photosensitive layer and increase abrasion resistance, filming resistance, and scratch resistance of the photosensitive member include compounds represented by formulas (11) to (17) (also referred to below as electron transport materials (11) to (17), respectively).

(11)

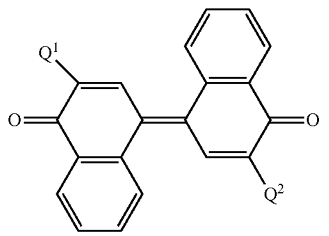

(12)

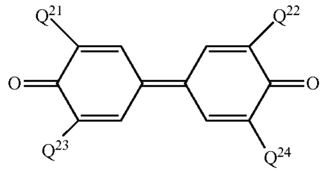

(13)

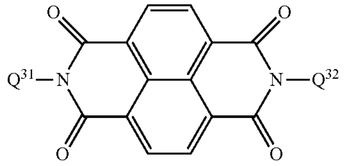

(14)

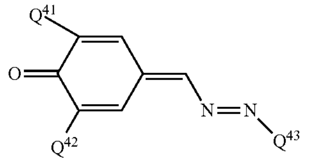

(15)

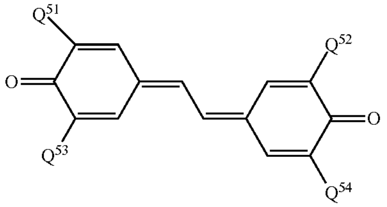

(16)

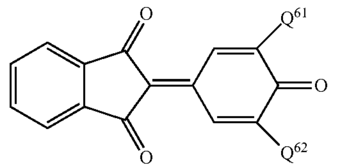

(17)

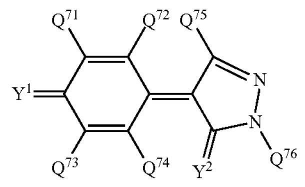

$Q^1$ and $Q^2$ in formula (11), $Q^{21}$, $Q^{22}$, $Q^{23}$, and $Q^{24}$ in formula (12), $Q^{31}$ and $Q^{32}$ in formula (13), $Q^{41}$, $Q^{42}$, and $Q^{43}$ in formula (14), $Q^{51}$, $Q^{52}$, $Q^{53}$, and $Q^{54}$ in formula (15), $Q^{61}$ and $Q^{62}$ in formula (16), and $Q^{71}$, $Q^{72}$, $Q^{73}$, $Q^{74}$, $Q^{75}$, and $Q^{76}$ in formula (17) each represent, independently of one another, a hydrogen atom, a halogen atom, a cyano group, an alkyl group with a carbon number of at least 1 and no greater than 6, an alkenyl group with a carbon number of at least 2 and no greater than 6, an alkoxy group with a carbon number of at least 1 and no greater than 6, or an aryl group with a carbon number of at least 6 and no greater than 14 optionally substituted with at least one substituent selected from the group consisting of a halogen atom and an alkyl group with a carbon number of at least 1 and no greater than 6. In formula (17), $Y^1$ and $Y^2$ each represent, independently of one another, an oxygen atom or a sulfur atom.

Preferably, $Q^1$ and $Q^2$ in formula. (11), $Q^{21}$, $Q^{22}$, $Q^{23}$, and $Q^{24}$ in formula (12), $Q^{31}$ and $Q^{32}$ in formula (13), $Q^{41}$, $Q^{42}$, and $Q^{43}$ in formula. (14), $Q^{51}$, $Q^{52}$, $Q^{53}$, and $Q^{54}$ in formula (15), $Q^{61}$ and $Q^{62}$ in formula. (16), and $Q^{71}$, $Q^{72}$, $Q^{73}$, $Q^{74}$, $Q^{75}$, and $Q^{76}$ in formula (17) each represent, independently of one another, a hydrogen atom, an alkyl group with a carbon number of at least 1 and no greater than 6, or an aryl group with a carbon number of at least 6 and no greater than 14 optionally substituted with at least one substituent selected from the group consisting of a halogen atom and alkyl group with a carbon number of at least 1 and no greater than 6. Preferably, $Y^1$ and $Y^2$ each represent an oxygen atom.

The alkyl group with a carbon number of at least 1 and no greater than 6 that is represented by $Q^1$ and $Q^2$ in formula (11), $Q^{21}$, $Q^{22}$, $Q^{23}$, and $Q^{24}$ in formula (12), $Q^{31}$ and $Q^{32}$ in formula (13), $Q^{41}$, $Q^{42}$, and $Q^{43}$ in formula (14), $Q^{51}$, $Q^{52}$, $Q^{53}$, and $Q^{54}$ in formula (15), $Q^{61}$ and $Q^{62}$ in formula. (16), and $Q^{71}$, $Q^{72}$, $Q^{73}$, $Q^{74}$, $Q^{75}$, and $Q^{76}$ in formula (17) is preferably an alkyl group with a carbon number of at least 1 and no greater than 5, more preferably a methyl group, an ethyl group, a propyl group, a butyl group, or a pentyl group, and particularly preferably a methyl group, an isopropyl group, a tert-butyl group, or a 1,1-dimethylpropyl group.

The aryl group with a carbon number of at least 6 and no greater than 14 that is represented by $Q^1$ and $Q^2$ in formula (11), $Q^{21}$, $Q^{22}$, $Q^{23}$, and $Q^{24}$ in formula (12). $Q^{31}$ and $Q^{32}$ in formula (13), $Q^{41}$, $Q^{42}$, and $Q^{43}$ in formula (14), $Q^{51}$, $Q^{52}$, $Q^{53}$, and $Q^{54}$ in formula (15), $Q^{61}$ and $Q^{62}$ in formula (16), and $Q^{71}$, $Q^{72}$, $Q^{73}$, $Q^{74}$, $Q^{75}$, and $Q^{76}$ in formula (17) is preferably an aryl group with a carbon number of at least 6 and no greater than 10, and more preferably a phenyl group. The aryl group with a carbon number of at least 6 and no greater than 14 may be substituted with at least one substituent selected from the group consisting of a halogen atom and an alkyl group with a carbon number of at least 1 and no greater than 6. The alkyl group with a carbon number of at least 1 and no greater than 6 that is a substituent is preferably an alkyl group with a carbon number of at least 1 and no greater than 3, and more preferably a methyl group or an ethyl group. The halogen atom that is a substituent is preferably a fluorine atom, a chlorine atom, or a bromine atom, and particularly preferably a chlorine atom. Where the aryl group with a carbon number of at least 6 and no greater than 14 is substituted with a substituent, the number of the substituents is preferably at least 1 and no greater than 5, and more preferably 1 or 2. The aryl group with a carbon number of at least 6 and no greater than 14 substituted with at least one substituent selected from the group consisting of a halogen atom and an alkyl group with a carbon number of at least 1 and no greater than 6 is preferably a chlorophenyl group, a dichlorophenyl group, or an ethylmethylphenyl group, and more preferably a 4-chlorophenyl group, a 2,5-dichlorophenyl group, or a 2-ethyl-6-methyl phenyl group.

Further preferable examples of the electron transport material include compounds represented by formulas (E-1) to (E-8) (also referred to below as electron transport materials (E-1) to (E-8), respectively).

(E-1)

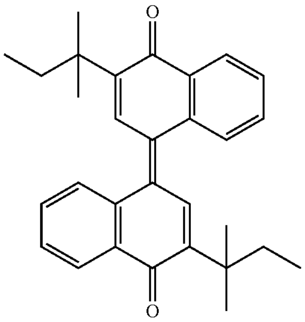

(E-2)

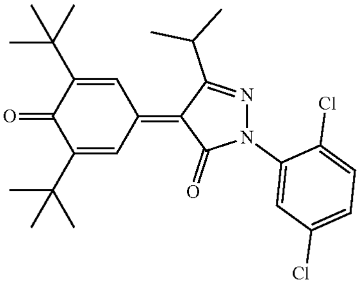

(E-3)

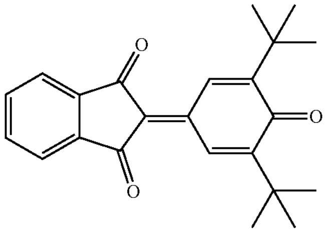

(E-4)

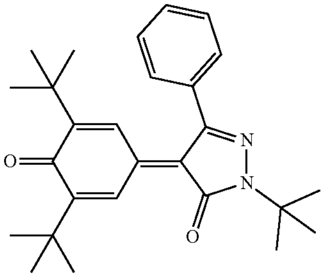

(E-5)

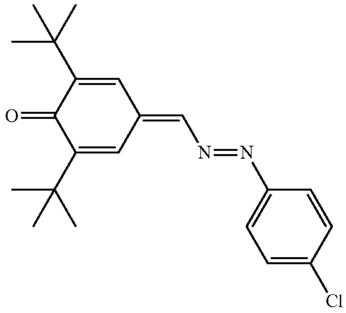

-continued (E-6)

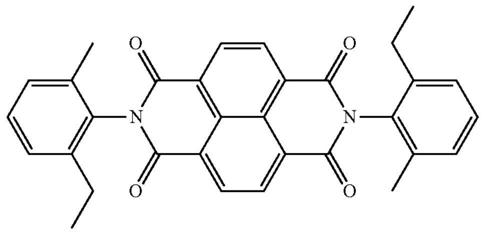

(E-7)

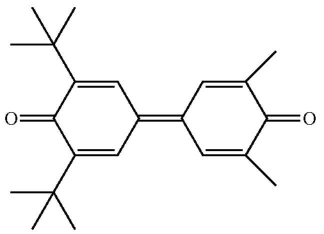

(E-8)

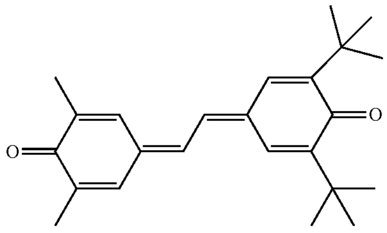

The content ratio of the electron transport material is preferably at least 5 parts by mass and no greater than 150 parts by mass relative to 100 parts by mass of the binder resin, more preferably at least 10 parts by mass and no greater than 100 parts by mass, and further preferably at least 30 parts by mass and no greater than 70 parts by mass. The photosensitive layer may contain only one electron transport material or may contain two or more electron transport materials.

(Hole Transport Material)

Examples of the hole transport material include triphenylamine derivatives, diamine derivatives (e.g., an N,N,N',N'-tetraphenylbenzidine derivative, an N,N,N',N'-tetraphenylphenylenediamine derivative, an N,N,N',N'-tetraphenylnaphtylenediamine derivative, an N,N,N',N'-tetraphenylphenanthrylnenediamine derivative, and a di(aminophenylethenyl)benzene derivative), oxadiazole-based compounds (e.g., 2,5-di(4-methylaminophenyl)-1,3,4-oxadiazole), styryl-based compounds (e.g., 9-(4-diethylaminostyryl)anthracene), carbazole-based compounds (e.g., polyvinyl carbazole), organic polysilane compounds, pyrazoline-based compounds (e.g., 1-phenyl-3-(p-dimethylaminophenyl)pyrazoline), hydrazone-based compounds, indole-based compounds, oxazole-based compounds, isoxazole-based compounds, thiazole-based compounds, thiadiazole-based compounds, imidazole-based compounds, pyrazole-based compounds, and triazole-based compounds.

Preferable examples of the hole transport material to favorably form the photosensitive layer and increase abrasion resistance, filming resistance, and scratch resistance of the photosensitive member include compounds represented by formulas (20) to (24) (also referred to below as hole transport materials (20) to (24), respectively). The hole transport material (20) or (23) can be used as the hole transport material, for example.

(20)

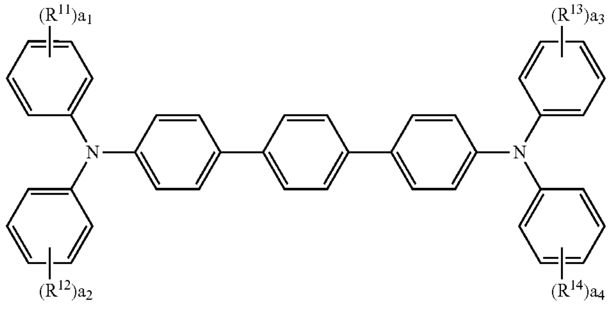

-continued
(21)
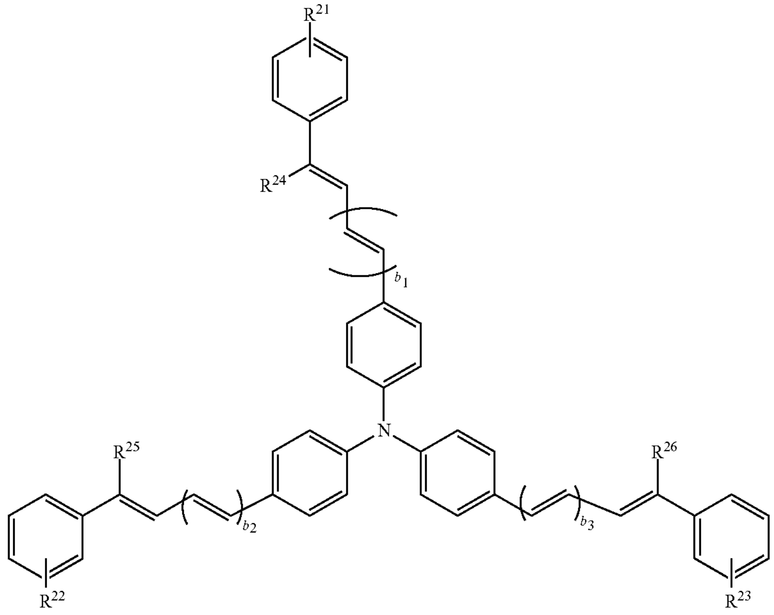
(22)
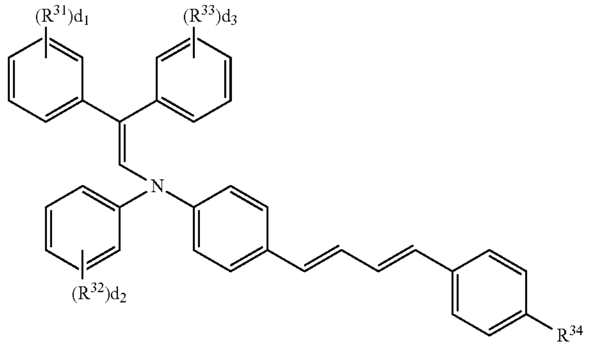
(23)
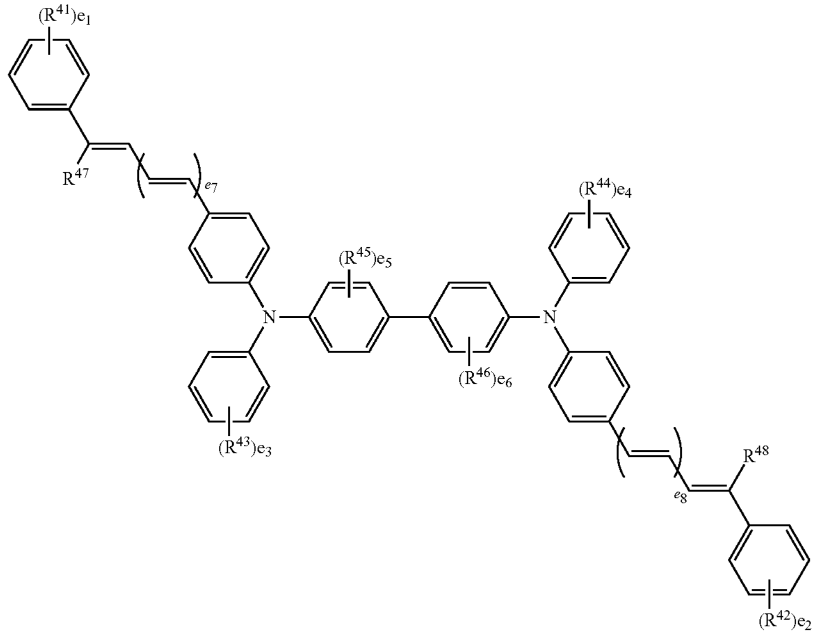

-continued (24)

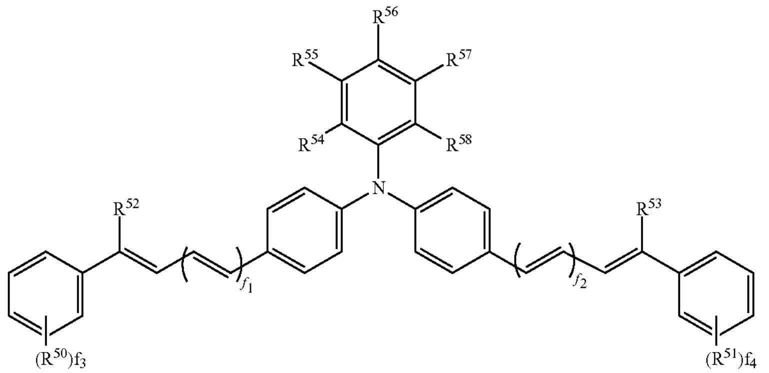

In formula (20), $R^{11}$, $R^{12}$, $R^{13}$, and $R^{14}$ each represent, independently of one another, an alkyl group with a carbon number of at least 1 and no greater than 6 or an alkoxy group with a carbon number of at least 1 and no greater than 6. $a_1$, $a_2$, $a_3$, and $a_4$ each represent, independently of one another, an integer of at least 0 and no greater than 5.

In formula (20), where $a_1$ represents an integer of at least 2 and no greater than 5, the chemical groups $R^{11}$ may represent the same group as or different groups from each other. Where $a_2$ represents an integer of at least 2 and no greater than 5, the chemical groups $R^{12}$ may represent the same group as or different groups from each other. Where $a_3$ represents an integer of at least 2 and no greater than 5, the chemical groups $R^{13}$ may represent the same group as or different groups from each other. Where $a_4$ represents an integer of at least 2 and no greater than 5, the chemical groups $R^{14}$ may represent the same group as or different groups from each other.

In formula (20), $R^{11}$, $R^{12}$, $R^{13}$, and $R^{14}$ each represent, independently of one another, preferably an alkyl group with a carbon number of at least 1 and no greater than 3, and more preferably a methyl group or an ethyl group. $a_1$, $a_2$, $a_3$, and $a_4$ each represent, independently of one another, preferably an integer of at least 1 and no greater than 3, and more preferably 1.

In formula (21), $R^{21}$, $R^{22}$, and $R^{23}$ each represent, independently of one another, an alkyl group with a carbon number of at least 1 and no greater than 6. $R^{24}$, $R^{25}$, and $R^{26}$ each represent, independently of one another, a hydrogen atom or an alkyl group with a carbon number of at least 1 and no greater than 6. $b_1$, $b_2$, and $b_3$ each represent, independently of one another, 0 or 1.

In formula (21), $R^{21}$, $R^{22}$, and $R^{23}$ each represent, independently of one another, preferably an alkyl group with a carbon number of at least 1 and no greater than 3, and more preferably a methyl group. $R^{21}$, $R^{22}$, and $R^{23}$ are each preferably bonded at a meta position of a phenyl group relative to an ethenyl group or a butadienyl group. Preferably, $R^{24}$, $R^{25}$, and $R^{26}$ each represent a hydrogen atom. Preferably, each of $b_1$, $b_2$, and $b_3$ represents 0 or 1.

In formula (22), $R^{31}$, $R^{32}$, and $R^{33}$ each represent, independently of one another, an alkyl group with a carbon number of at least 1 and no greater than 6. $R^{34}$ represents a hydrogen atom or an alkyl group with a carbon number of at least 1 and no greater than 6. $d_1$, $d_2$, and $d_3$ each represent, independently of one another, an integer of at least 0 and no greater than 5.

In formula (22), where $d_1$ represents an integer of at least 2 and no greater than 5, the chemical groups $R^{31}$ may represent the sane group as or different groups from each other. Where $d_2$ represents an integer of at least 2 and no greater than 5, the chemical groups $R^{31}$ may represent the same group as or different groups from each other. Where $d_3$ represents an integer of at least 2 and no greater than 5, the chemical groups $R^{33}$ may represent the same group as or different groups from each other.

In formula (22), $R^{34}$ preferably represents a hydrogen atom. Preferably, $d_1$, $d_2$, and $d_3$ each represent 0.

In formula (23), $R^{41}$, $R^{42}$, $R^{43}$, $R^{44}$, $R^{45}$, and $R^{46}$ each represent, independently of one another, a phenyl group or an alkyl group with a carbon number of at least 1 and no greater than 6. $R^{47}$ and $R^{48}$ each represent, independently of one another, a hydrogen atom, a phenyl group, or an alkyl group with a carbon number of at least 1 and no greater than 6. $e_1$, $e_2$, $e_3$, and $e_4$ each represent, independently of one another, an integer of at least 0 and no greater than 5. $e_5$ and $e_6$ each represent, independently of one another, an integer of at least 0 and no greater than 4. $e_7$ and $e_8$ each represent, independently of one another, 0 or 1.

In formula (23), where $e_1$ represents an integer of at least 2 and no greater than 5, the chemical groups $R^{41}$ may represent the same group as or different groups from each other. Where $e_2$ represents an integer of at least 2 and no greater than 5, the chemical groups $R^{42}$ may represent the same group as or different groups from each other. Where $e_3$ represents an integer of at least 2 and no greater than 5, the chemical groups $R^{43}$ may represent the same group as or different groups from each other. Where $e_4$ represents an integer of at least 2 and no greater than 5, the chemical groups $R^{44}$ may represent the same group as or different groups from each other. Where $e_5$ represents an integer of at least 2 and no greater than 4, the chemical groups $R^{45}$ may represent the same group as or different groups from each other. Where $e_6$ represents an integer of at least 2 and no greater than 4, the chemical groups $R^{46}$ may represent the same group as or different groups from each other.

In formula (23), $R^{41}$ to $R^{46}$ each represent, independently of one another, preferably an alkyl group with a carbon number of at least 1 and no greater than 6, more preferably an alkyl group with a carbon number of at least 1 and no greater than 3, and further preferably a methyl group or an ethyl group. Each of $R^{47}$ and $R^{48}$ preferably represents a hydrogen atom. Preferably, $e_1$, $e_2$, $e_3$, and $e_4$ each represent, independently of one another, an integer of at least 0 and no greater than 2. It is more preferable that $e_1$ and $e_2$ each represent 0 while $e_3$ and $e_4$ each represent 2. Preferably, $e_5$ and $e_6$ each represent 0. Preferably, $e_7$ and $e_8$ each represent 0 or each represent 1.

In formula (24). $R^{50}$ and $R^{51}$ each represent, independently of one another, a phenyl group, an alkyl group with a carbon number of at least 1 and no greater than 6, or an alkoxy group with a carbon number of at least 1 and no greater than 6. $R^{52}$, $R^{53}$, $R^{54}$, $R^{55}$, $R^{56}$, $R^{57}$, and $R^{58}$ each represent, independently of one another, a hydrogen atom, an alkyl group with a carbon number of at least 1 and no greater than 6, an alkoxy group with a carbon number of at least 1 and no greater than 6, or a phenyl group optionally substituted with an alkyl group with a carbon number of at least 1 and no greater than 6. $f_1$ and $f_2$ each represent, independently of one another, an integer of at least 0 and no greater than 2. $f_3$ and $f_4$ each represent, independently of one another, an integer of at least 0 and no greater than 5.

In formula (24), where $f_3$ represents an integer of at least 2 and no greater than 5, the chemical groups $R^{50}$ may represent the same group as or different groups from each other. Where $f_4$ represents an integer of at least 2 and no greater than 5, the chemical groups $R^{51}$ may represent the same group as or different groups from each other.

In formula (24), preferably, $R^{50}$ and $R^{51}$ each represent, independently of one another, an alkyl group with a carbon number of at least 1 and no greater than 6. Preferably, $R^{52}$ and $R^{53}$ each represent a hydrogen atom or a phenyl group optionally substituted with an alkyl group with a carbon number of at least 1 and no greater than 6. Preferably, $R^{54}$ to $R^{58}$ each represent, independently of one another, a hydrogen atom, an alkyl group with a carbon number of at least 1 and no greater than 6, or an alkoxy group with a carbon number of at least 1 and no greater than 6. Preferably, each of $f_1$ and $f_2$ represents 0, 1, or 2. Preferably, $f_3$ and $f_4$ each represent, independently of one another, 0 or 1.

The alkyl group with a carbon number of at least 1 and no greater than 6 that is represented by $R^{50}$ or $R^{51}$ is preferably an alkyl group with a carbon number of at least 1 and no greater than 3, and more preferably a methyl group. The phenyl group optionally substituted with an alkyl group with a carbon number of at least 1 and no greater than 6 that is represented by $R^{52}$ or $R^{53}$ is preferably a phenyl group or a phenyl group substituted with an alkyl group with a carbon number of at least 1 and no greater than 3. The phenyl group substituted with an alkyl group with a carbon number of at least 1 and no greater than 3 is preferably a methylphenyl group, and more preferably 4-methylphenyl group. The alkyl group with a carbon number of at least 1 and no greater than 6 that is represented by any of $R^{54}$ to $R^{58}$ is preferably an alkyl group with a carbon number of at least 1 and no greater than 4, and more preferably a methyl group, an ethyl group, or an n-butyl group. The alkoxy group with a carbon number of at least 1 and no greater than 6 that is represented by any of $R^{54}$ to $R^{58}$ is preferably an alkoxy group with a carbon number of at least 1 and no greater than 3, and more preferably an ethoxy group.

More preferable examples of the hole transport material include compounds represented by formulas (H-1) to (H-10) (also referred to below % as hole transport materials (H-1) to (H-10) respectively).

(H-1)

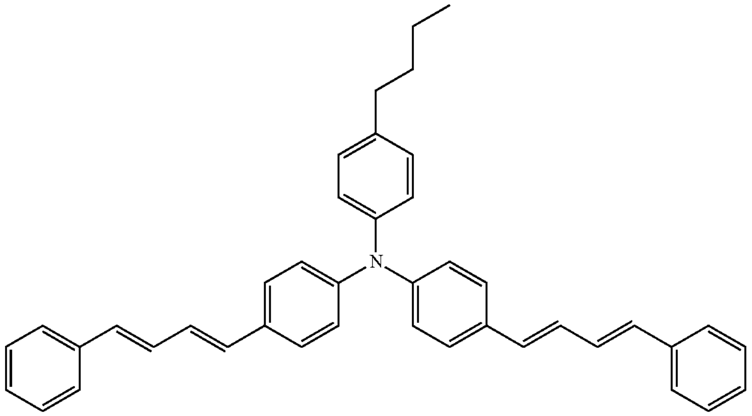

(H-2)

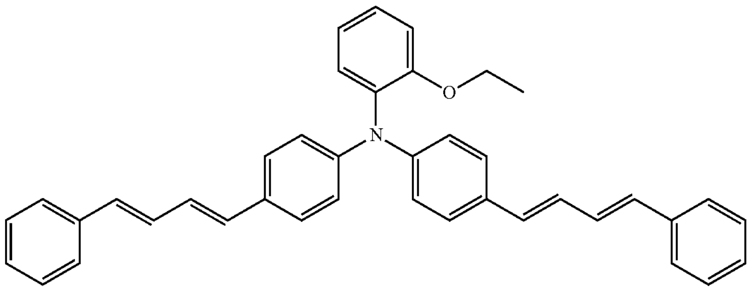

-continued
(H-3)
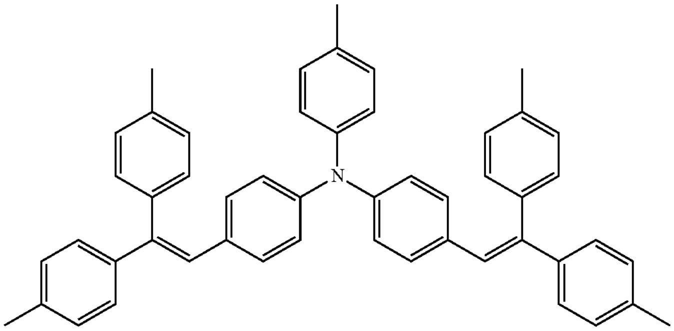
(H-4)
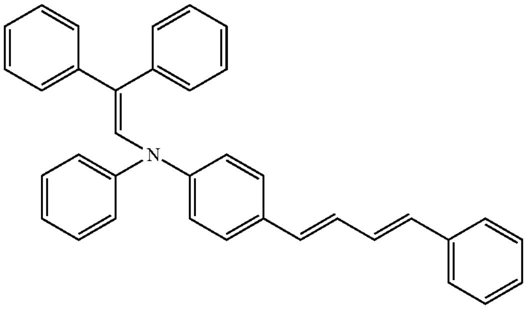
(H-5)
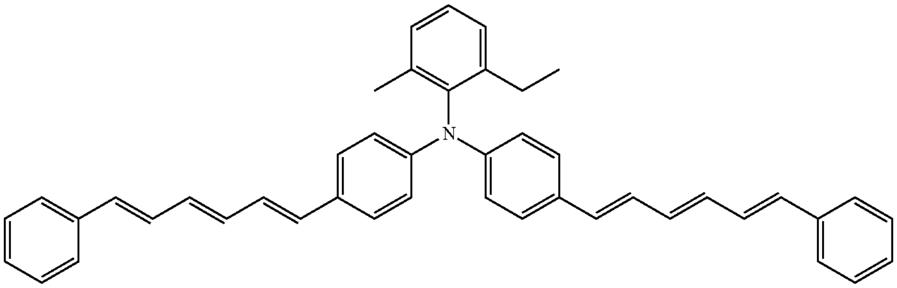
(H-6)
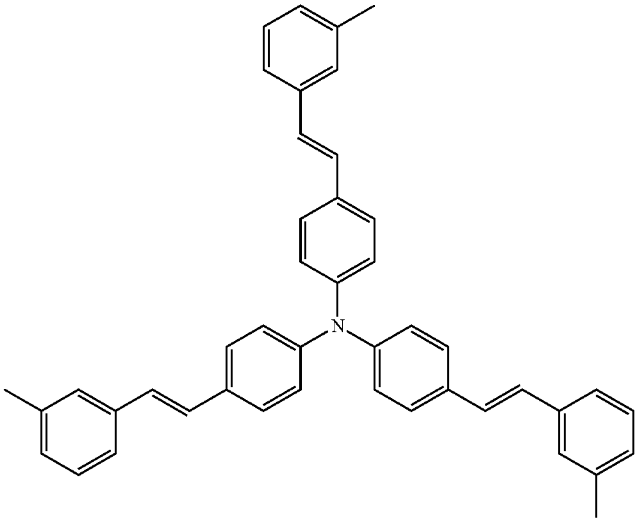

-continued
(H-7)
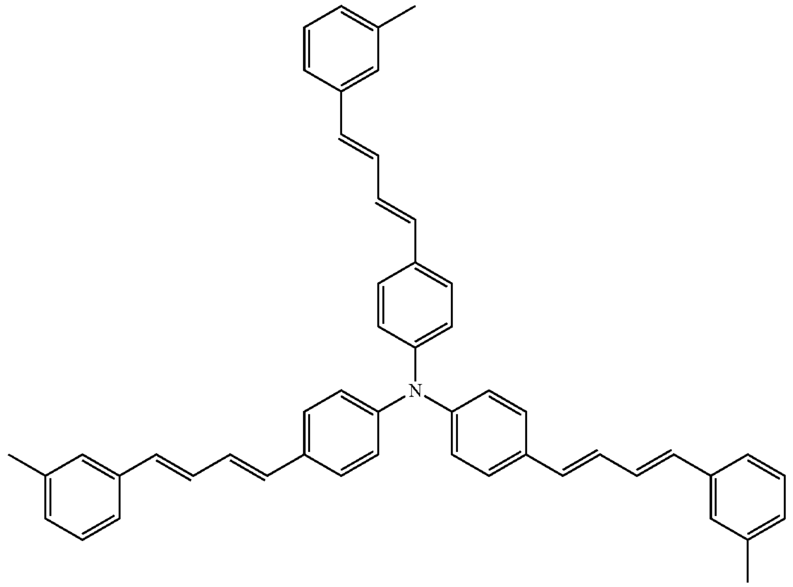
(H-8)
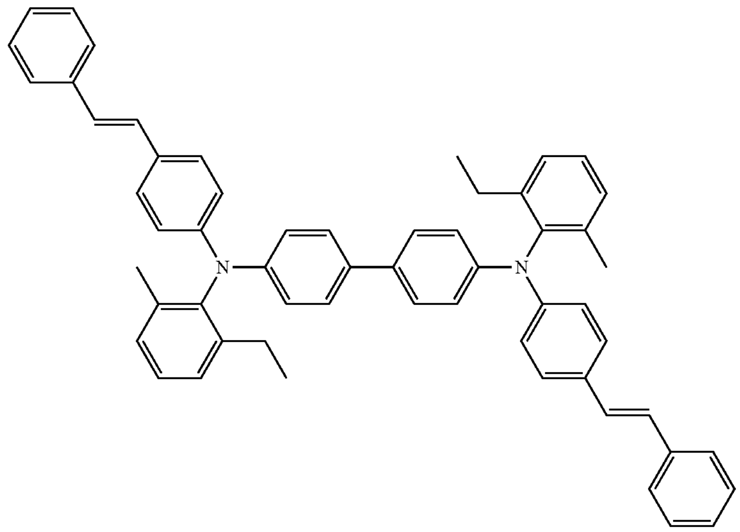

-continued (H-9)

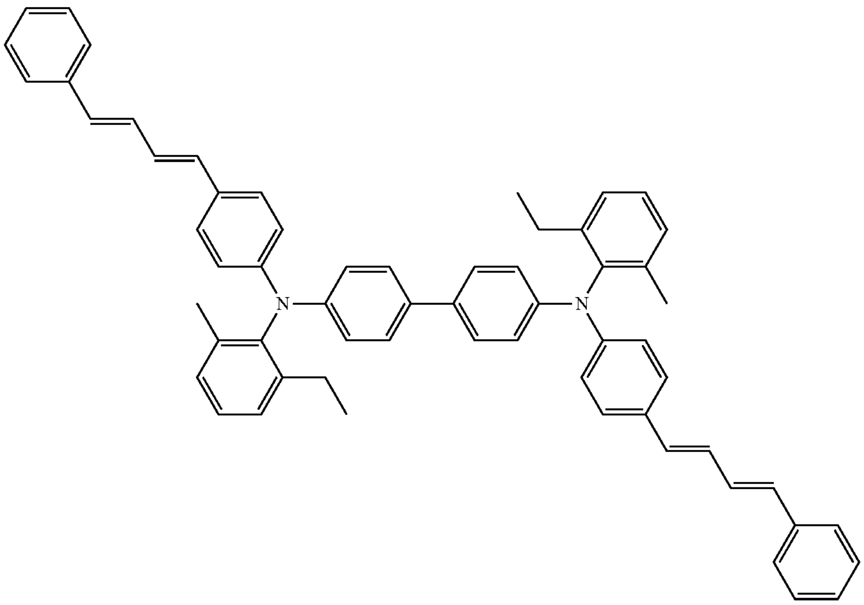

(H-10)

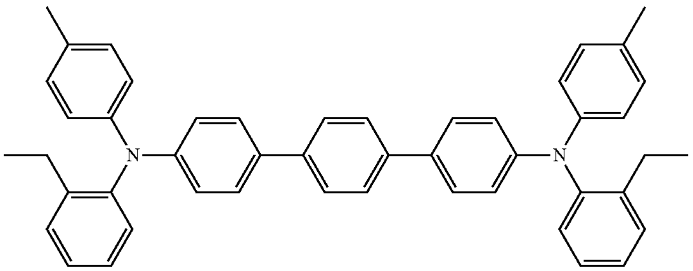

The content ratio of the hole transport material is preferably at least 10 parts by mass and no greater than 200 parts by mass relative to 100 parts by mass of the binder resin, more preferably at least 30 parts by mass and no greater than 120 parts by mass, and further preferably at least 50 parts by mass and no greater than 90 parts by mass. The photosensitive layer may contain one hole transport material or may contain two or more hole transport materials.

(Resin Particles)

The resin particles are contained in the photosensitive layer as filler particles, for example. As a result of containing the resin particles together with the polyarylate resin (PA), the photosensitive layer can have increased elasticity, so that paper dust and an external additive of toner are hardly buried in the photosensitive layer. Accordingly, the external additive and paper dust attached to the photosensitive layer are favorably cleaned off, thereby increasing filming resistance of the photosensitive member. Furthermore, when the photosensitive layer contains relatively hard resin particles, formation of scratches on the photosensitive layer can be inhibited and scratch resistance of the photosensitive member can be increased. In addition, as a result of the photosensitive layer containing the resin particles, minute projections and recesses are formed on the surface of the photosensitive layer to reduce the contact area between a cleaning member such as a cleaning blade and the surface of the photosensitive layer. This increases abrasion resistance of the photosensitive member.

The resin particles when contained in the photosensitive layer can increase elasticity of the photosensitive layer as compared with non-resin particles (e.g., silica QC) particles or alumina particles). Furthermore, the resin particles when contained in the photosensitive layer can reduce surface frictional resistance of the photosensitive layer as compared with the non-resin particles. Moreover, the resin particles when contained in the photosensitive layer hardly impair electrical characteristics of the photosensitive member as compared with the non-resin particles. Thus, abrasion resistance, filming resistance, and scratch resistance of the photosensitive member can be increased while the electrical characteristics of the photosensitive member are maintained as a result of the photosensitive layer containing the resin particles rather than the non-resin particles. In order to increase abrasion resistance, filming resistance, and scratch resistance, the photosensitive layer preferably does not contain any filler particles (e.g., metal particles, and more specifically, silica particles or alumina particles) other than the resin particles as the filler particles.

The resin particles are preferably particles of a resin other than the binder resin, more preferably particles of a resin different from a polyarylate resin, and further preferably silicone resin particles. When the photosensitive layer contains particles of a silicone resin with siloxane structure, surface frictional resistance of the photosensitive layer can be further reduced and abrasion resistance of the photosensitive member can be further increased.

The resin particles have a volume median diameter ($D_{50}$) of preferably at least 0.05 μm, more preferably at least 0.50 μm, and further preferably at least 0.60 μm. By contrast, the resin particles have a volume median diameter of preferably no greater than 5.00 μm, more preferably no greater than 3.00 μm, and further preferably no greater than 1.00 μm. As a result of the volume median diameter of the resin particles being set to at least 0.05 μm and no greater than 5.00 μm, abrasion resistance, filming resistance, and scratch resistance of the photosensitive member can be further increased. The volume median diameter of the resin particles is measured using a precision particle size distribution analyzer ("COULTER COUNTER MULTISIZER 3", product of Beckman Coulter, Inc.), for example. The term volume median diameter refers to a median diameter calculated in terms of volume by the Coulter Counter method.

The percentage content of the resin particles is preferably at least 0.01% by mass relative to the mass of the photosensitive layer, more preferably at least 0.5% by mass, further preferably at least 1.0% by mass, still further preferably at least 2.5 parts by mass, and particularly preferably at least 5.0% by mass. The percentage content of the resin particles is preferably no greater than 15.0% by mass relative to the mass of the photosensitive layer, more preferably no greater than 11.0% by mass, further preferably no greater than 10.0% by mass, and particularly preferably no greater than 9.5% by mass. As a result of the percentage content of the resin particles being set to at least 0.01% by mass and no greater than 15.0% by mass relative to the mass of the photosensitive layer, abrasion resistance, filming resistance, and scratch resistance of the photosensitive member can be further increased. Furthermore, as a result of the percentage content of the resin particles being set to at least 0.01% by mass and no greater than 15.0% by mass relative to the mass of the photosensitive layer, production of image defects (e.g., stain such as black spots) due to surface roughness of the photosensitive member can be favorably inhibited.

Preferably, the resin particles are spherical in shape. Spherical resin particles hardly agglomerate in a solvent for photosensitive layer formation as compared with acicular resin particles. Therefore, a photosensitive layer in which the resin particles are dispersed uniformly can be formed favorably. Furthermore, the spherical resin particles tends to reduce surface frictional resistance of the photosensitive layer as compared with the acicular resin particles. Therefore, abrasion resistance of the photosensitive member is further increased. The shape of the resin particles can be determined by observing a section of the photosensitive layer using an electron microscope, for example.

(Additive)

Examples of the additive include an ultraviolet absorbing agent, an antioxidant, a radical scavenger, a singlet quencher, a softener, a surface modifier, an extender, a thickener, a wax, a donor, a surfactant, a plasticizer, a sensitizer, and a leveling agent.

(Conductive Substrate)

No particular limitations are placed on the conductive substrate other than being a conductive substrate that can be used in a photosensitive member. It is only required that at least a surface portion of the conductive substrate be constituted by a conductive material. An example of the conductive substrate is a conductive substrate constituted by a conductive material. Another example of the conductive substrate is a conductive substrate covered with a conductive material. Examples of the conductive material include aluminum, iron, copper, tin, platinum, silver, vanadium, molybdenum, chromium, cadmium, titanium, nickel, palladium, indium, stainless steel, and brass. Among the conductive materials listed above, aluminum or an aluminum alloy is preferable in terms of favorable charge mobility from the photosensitive layer to the conductive substrate.

The conductive substrate may have any shape and the shape thereof can be selected as appropriate according to the configuration of an image forming apparatus in which the conductive substrate is to be used. The conductive substrate has a sheet shape or a drum shape, for example. The thickness of the conductive substrate is selected as appropriate according to the shape of the conductive substrate.

(Intermediate Layer)

The intermediate layer (undercoat layer) contains for example inorganic particles and a resin (intermediate layer resin) for intermediate layer use. Provision of the intermediate layer may facilitate flow of electric current generated when the photosensitive member is exposed to light and inhibit increasing resistance, while also maintaining insulation to a sufficient degree so as to inhibit leakage of the electric current from occurring.

Examples of the inorganic particles include particles of metals (e.g., aluminum, iron, and copper), particles of metal oxides (e.g., titanium oxide, alumina, zirconium oxide, tin oxide, and zinc oxide), and particles of non-metal oxides (e.g., silica).

Examples of the intermediate layer resin are the same as those listed as the examples of the additional binder resin as described previously. In order to favorably form the intermediate layer and the photosensitive layer, the intermediate layer resin is preferably different from the binder resin contained in the photosensitive layer. The intermediate layer may contain an additive. Examples of the additive contained in the intermediate layer are the same as those listed as the examples of the additive contained in the photosensitive layer.

(Photosensitive Member Production Method)

An example of a photosensitive member production method will be described next. The photosensitive member production method includes a photosensitive layer formation process. In the photosensitive layer formation process, an application liquid (also referred to below as application liquid for photosensitive layer formation) for forming a photosensitive layer is prepared. The application liquid for photosensitive layer formation is applied onto a conductive substrate. Next, at least a portion of a solvent contained in the applied application liquid for photosensitive layer formation is removed to form a photosensitive layer. The application liquid for photosensitive layer formation contains a charge generating material, a hole transport material, an electron transport material, a binder resin, the solvent, and either or both of resin particles and an additive as necessary, for example. The application liquid for photosensitive layer formation is prepared by dissolving or dispersing in the solvent the charge generating material, the hole transport material, the electron transport material, the binder resin, and either or both of the resin particles and the additive as necessary.

No particular limitations are placed on the solvent contained in the application liquid for photosensitive layer formation other than being capable of dissolving or dispersing each component contained in the application liquid for photosensitive layer formation. Examples of the solvent include alcohols (specific examples include methanol, ethanol, isopropanol, and butanol), aliphatic hydrocarbons (specific examples include n-hexane, octane, and cyclohexane), aromatic hydrocarbons (specific examples include benzene, toluene, and xylene), halogenated hydrocarbons (specific examples include dichloromethane, dichloroethane, carbon tetrachloride, and chlorobenzene), ethers (specific examples include dimethyl ether, diethyl ether, tetrahydrofuran, ethylene glycol dimethyl ether, and diethylene glycol dimethyl ether), ketones (specific examples include acetone, methyl ethyl ketone, and cyclohexanone), esters (specific examples include ethyl acetate and methyl acetate), dimethyl formaldehyde, dimethyl formamide, and dimethyl sulfoxide.

The application liquid for photosensitive layer formation is prepared by mixing these components to disperse the components in the solvent. Mixing or dispersion can for example be performed using a bead mill, a roll mill, a ball mill, an attritor, a paint shaker, a rod-shaped sonic oscillator, or an ultrasonic disperser.

No particular limitations are placed on a method for applying the application liquid for photosensitive layer formation other than being capable of applying the application liquid for photosensitive layer formation uniformly. Examples of the method for applying the application liquid for photosensitive layer formation include dip coating, spray coating, spin coating, and bar coating.

Examples of a method for removing at least a portion of the solvent contained in the application liquid for photosensitive layer formation include heating, pressure reduction, and a combination of heating and pressure reduction. One specific example of the method involves heat treatment (hot-air drying) using a high-temperature dryer or a reduced pressure dryer. The temperature of the heat treatment is at least 40° C. and no greater than 150'C, for example. The heat treatment is performed for at least 3 minutes and no greater than 120 minutes, for example.

Note that the photosensitive member production method may further include a process of forming an intermediate layer as necessary. Any known method can be selected as appropriate as the process of forming an intermediate layer.

Second Embodiment: Image Forming Apparatus

Figure 4:
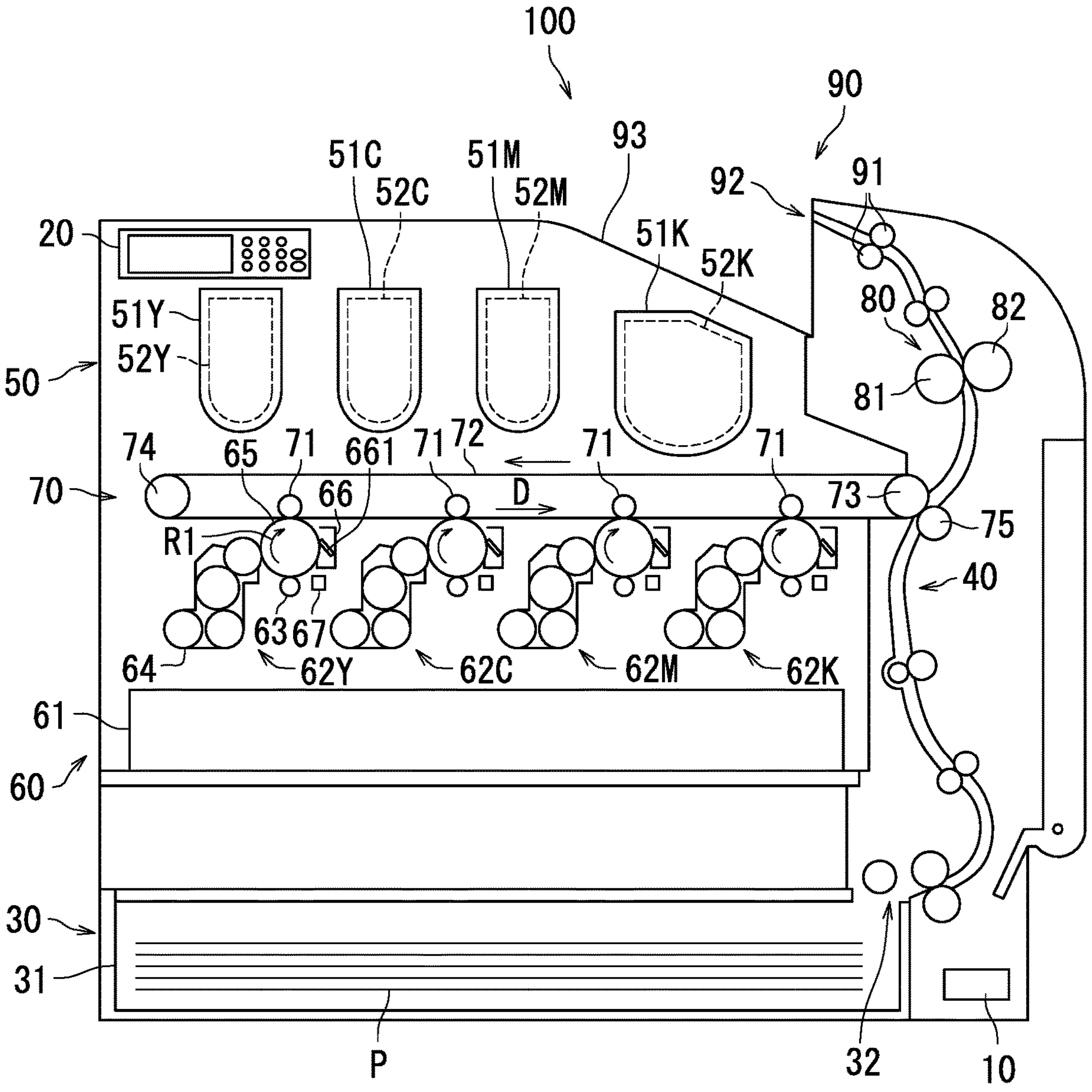
FIG. 4 is a diagram illustrating an example of the configuration of an image forming apparatus according to a second embodiment of the present disclosure.

With reference to FIG. 4, an image forming apparatus 100 according to a second embodiment of the present disclosure will be described next. FIG. 4 is a diagram illustrating an example of the configuration of the image forming apparatus 100. The image forming apparatus 100 is a tandem color printer, for example.

As illustrated in FIG. 4, the image forming apparatus 100 includes a controller 10, an operation section 20, a sheet feed section 30, a conveyance section 40, a toner replenishing section 50, an image forming section 60, a transfer device 70, a fixing device 80, and an ejection section 90.

The controller 10 controls operation of each element included in the image forming apparatus 100. The controller 10 includes a processor (not illustrated) and storage (not illustrated). The processor includes a central processing unit (CPU), for example. The storage include memory such as semiconductor memory, and may include a hard disk drive (HDD). The processor executes control programs to control the operation of the image forming apparatus 100. The storage stores the control programs therein.

The operation section 20 receives an instruction from a user. Upon receiving the instruction from the user, the operation section 20 transmits a signal indicating the instruction from the user to the controller 10. In response, image forming operation by the image forming apparatus 100 starts.

The sheet feed section 30 includes a sheet feed cassette 31 and a sheet feed roller group 32. The sheet feed cassette 31 accommodates sheets of a recording medium P (e.g., paper). The sheet feed roller group 32 feeds the sheets accommodated in the sheet feed cassette 31 one at a time to the conveyance section 40.

The conveyance section 40 includes a roller and a guide member. The conveyance section 40 extends from the sheet feed section 30 to the ejection section 90. The conveyance section 40 conveys the recording medium P from the sheet feed section 30 to the ejection section 90 via the image forming section 60 and the fixing device 80.

The toner replenishing section 50 replenishes the image forming section 60 with toner. The toner replenishing section 50 includes a first fitting section 51Y a second fitting section 51C, a third fitting section 51M, and a fourth fitting section 51K.

A first toner container 52Y is fitted to the first fitting section 51Y. Similarly, a second toner container 52C is fitted to the second fitting section 51C, a third toner container 52M is fitted to the third fitting section 51M, and a fourth toner container 52K is fitted to the fourth fitting section 51K.

Respective toners are loaded in the first toner container 52Y, the second toner container 52C, the third toner container 52M, and the fourth toner container 52K. In the second embodiment, a yellow toner is loaded in the first toner container 52Y A cyan toner is loaded in the second toner container 52C. A magenta toner is loaded in the third toner container 52M. A black toner is loaded in the fourth toner container 52K.

The image forming section 60 includes a light exposure device 61, a first image forming unit 62Y, a second image forming unit 62C, a third image forming unit 62M, and a fourth image forming unit 62K.

Each of the first to fourth image forming units 62Y to 62K includes a charger 63, a development device 64, an image bearing member 65, a cleaner 66, and a static eliminator 67.

Note that the configurations of the first to fourth image forming units 62Y to 62K are the same as each other except the types of the toners supplied from the toner replenishing section 50. Therefore, indication of the reference sign for each element of the second to fourth image forming units 62C to 621K is omitted in FIG. 4.

The image bearing member 65 is the photosensitive member 1 of the first embodiment. As has been described in the first embodiment, the photosensitive member 1 in the first embodiment includes a favorably formed photosensitive layer and has excellent abrasion resistance, filming resistance, and scratch resistance. As such, the photosensitive member 1 being the image bearing member 65 of the image forming apparatus 100 of the second embodiment includes a favorably formed photosensitive laver, and the image forming apparatus 100 can have increased abrasion resistance, filming resistance, and scratch resistance.

The charger 63, the development device 64, the cleaner 66, and the static eliminator 67 are disposed along the circumferential surface of the image bearing member 65. In the second embodiment, the image bearing member 65 rotates in a direction (clockwise direction) indicated by an arrow R1 in FIG. 4.

The charger 63 charges the surface (circumferential surface) of the image bearing member 65. The charger 63 uniformly charges the image bearing member 65 to a specific polarity by discharging. In the second embodiment, the charger 63 charges the image bearing member 65 to a positive polarity. The charger 63 is a charging roller, for example.

The light exposure device 61 exposes the charged surface of the image bearing member 65 to light. In detail, the light exposure device 61 irradiates the charged surface of the image bearing member 65 with laser light. Through the above, an electrostatic latent image is formed on the surface of the image bearing member 65.

The corresponding toner is supplied from the toner replenishing section 50 to the development device 64. The development device 64 supplies the toner supplied from the toner replenishing section 50 to the surface of the image bearing member 65. As a result, the electrostatic latent image formed on the surface of the image bearing member 65 is developed into atoner image.

In the second embodiment, the development device 64 of the first image forming unit 62Y is connected to the first toner container 52Y As such, the yellow toner is supplied to the development device 64 of the first image forming unit 62Y Accordingly, a yellow toner image is formed on the surface of the image bearing member 65 of the first image forming unit 62Y.

Similarly, the development device 64 of the second image forming unit 62C, the development device 64 of the third image forming unit 62M, and the development device 64 of the fourth image forming unit 62K are respectively connected to the second toner container 52C, the third toner container 52M, and the fourth toner container 52K. As such, the cyan toner, the magenta toner, and the black toner are respectively supplied to the development device 64 of the second image forming unit 62C, the development device 64 of the third image forming unit 62M, and the development device 64 of the fourth image forming unit 62K. Accordingly, a cyan toner image, a magenta toner image, and a black toner image are respectively formed on the surface of the image bearing member 65 of the second image forming unit 62C, the surface of the image bearing member 65 of the third image forming unit 62M, and the surface of the image bearing member 65 of the fourth image forming unit 62K.

The cleaner 66 includes a cleaning member 661. After transfer by a later-described primary transfer roller 71, the cleaner 66 collects toner attached to the surface of the image bearing member 65. In detail, the cleaner 66 collects toner attached to the surface of the image bearing member 65 by pressing the cleaning member 661 against the surface of the image bearing member 65. The cleaning member 661 is a cleaning blade, for example.

The static eliminator 67 eliminates static electricity from the surface of the image bearing member 65 by irradiating the surface of the image bearing member 65 with static elimination light.

The transfer device 70 transfers the toner images from the image bearing members 65 to the recording medium P that is a transfer target. In detail, the transfer device 70 transfers the toner images formed on the respective surfaces of the image bearing members 65 of the first to fourth image forming units 62Y to 621K to the recording medium P in a superimposed manner. In the second embodiment, the transfer device 70 transfers the toner images to the recording medium P in a superimposed manner by a secondary transfer process (intermediate transfer process). The transfer device 70 includes four primary transfer rollers 71, an intermediate transfer belt 72, a drive roller 73, a driven roller 74, and a secondary transfer roller 75.

The intermediate transfer belt 72 is an endless belt wound around the four primary transfer rollers 71, the drive roller 73, and the driven roller 74. The intermediate transfer belt 72 is driven in response to rotation of the drive roller 73. In FIG. 4, the intermediate transfer belt 72 circulates anticlockwise. The driven roller 74 is rotationally driven according to driving of the intermediate transfer belt 72.

The first to fourth image forming units 62Y to 62K are disposed opposite to the lower surface of the intermediate transfer belt 72. In the second embodiment, the first to fourth image forming units 62Y to 62K are disposed in the order of the first to fourth image forming units 62Y to 62K from upstream to downstream in terms of a driving direction D of the intermediate transfer belt 72.

The primary transfer rollers 71 are each disposed opposite to a corresponding one of the image bearing members 65 with the intermediate transfer belt 72 therebetween, and pressed toward the image bearing member 65. As such, the toner images formed on the respective surfaces of the image bearing members 65 are sequentially transferred to the intermediate transfer belt 72 by the corresponding primary transfer rollers 71. In the second embodiment, the yellow toner image, the cyan toner image, the magenta toner image, and the black toner image are sequentially transferred to the intermediate transfer belt 72 in the stated order in a superimposed manner. In the following, a toner image formed by superimposing the yellow toner image, the cyan toner image, the magenta toner image, and the black toner image may be also referred to below as "layered toner image".

The secondary transfer roller 75 is disposed opposite to the drive roller 73 with the intermediate transfer belt 72 therebetween. The secondary transfer roller 75 is pressed toward the drive roller 73. In the above configuration, a transfer nip is formed between the secondary transfer roller 75 and the drive roller 73. When the recording medium P passes through the transfer nip, the layered toner image on the intermediate transfer belt 72 is transferred to the recording medium P by the secondary transfer roller 75. In the second embodiment, the yellow toner image, the cyan toner image, the magenta toner image, and the black toner image are transferred to the recording medium P in the stated order so as to be lower layers from upper layers. The recording medium P with the layered toner image transferred thereto is conveyed to the fixing device 80 by the conveyance section 40.

The fixing device 80 includes a heating member 81 and a pressure member 82. The heating member 81 and the pressure member 82 are disposed opposite to each other to form a fixing nip. When passing through the fixing nip, the recording medium P conveyed from the image forming section 60 is pressed while being heated at a specific fixing temperature. As a result, the layered toner image is fixed to the recording medium P. The recording medium P is conveyed from the fixing device 80 to the ejection section 90 by the conveyance section 40.

The ejection section 90 includes an ejection roller pair 91 and an exit tray 93. The ejection roller pair 91 conveys the recording medium P to the exit tray 93 through an exit port 92. The exit port 92 is formed in an upper part of the image forming apparatus 100.

Figure 5:
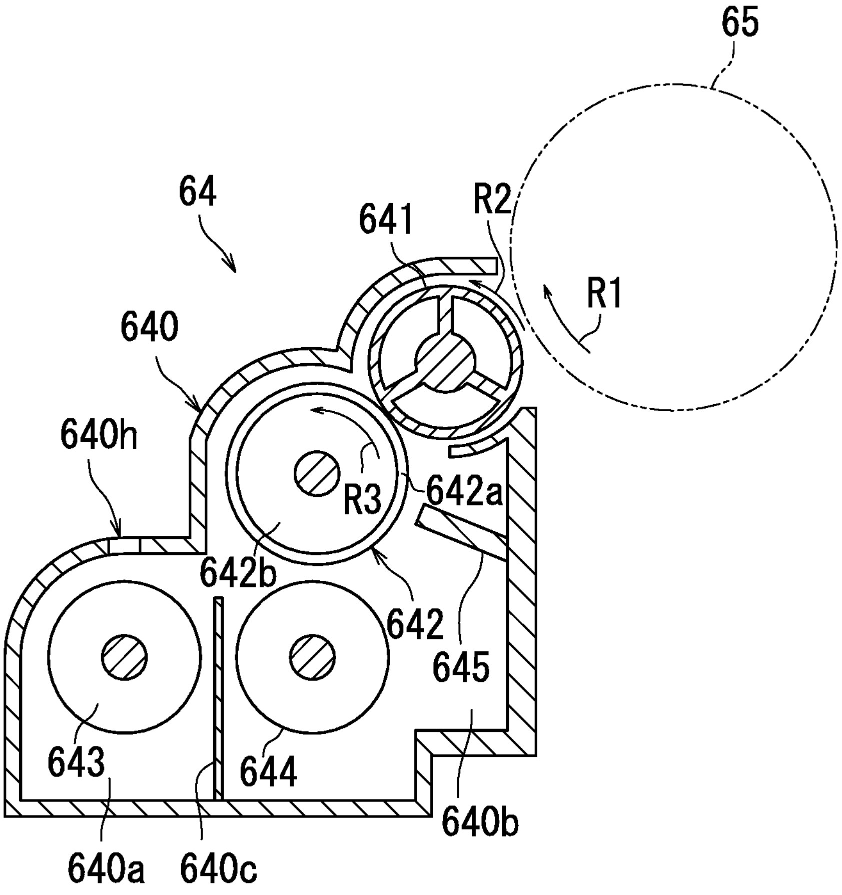
FIG. 5 is a diagram illustrating an example of the configuration of a development device illustrated in FIG. 4.

The configuration of the development device 64 will be described next in detail with reference to FIG. 5. FIG. 5 is a diagram illustrating an example of the configuration of the development device 64. In detail, FIG. 5 illustrates the development device 64 of the first image forming unit 62Y. Note that the image bearing member 65 is illustrated with a dashed and double dotted line in FIG. 5 for facilitating understanding. In the second embodiment, the development device 64 adopts a touch-down development process and a two-component development process using a two-component developer.

As has been described previously with reference to FIG. 4, a developer container 640 of the development device 64 is connected to the first toner container 52Y As such, the yellow toner is supplied to the developer container 640 of the development device 64 through a toner replenishment port 640*h*.

As illustrated in FIG. 5, the development device 64 includes inside the developer container 640 a development roller 641, a magnetic roller 642, a first stirring screw 643, a second stirring screw 644, and a blade 645. Specifically the development roller 641 is disposed opposite to the magnetic roller 642. The magnetic roller 642 is disposed opposite to the second stirring screw 644. The blade 645 is disposed opposite to the magnetic roller 642.

The developer container 640 is divided into a first stirring chamber 640*a* and a second stirring chamber 640*b* by a partition wall 640*c*. The partition wall 640*c* extends in the axial direction of the development roller 641. The first stirring chamber 640*a* and the second stirring chamber 640*b* communicate with each other at the outside of each opposite end of the partition wall 640*c* in the longitudinal direction of the partition wall 640*c*.

The first stirring screw 643 is disposed in the first stirring chamber 640*a*. A carrier that is a magnetic material is contained in the first stirring chamber 640*a*. A toner that is a non-magnetic material is supplied to the first stirring chamber 640*a* through the toner replenishment port 640*h*. The yellow toner is supplied to the first stirring chamber 640*a* in the example illustrated in FIG. 5.

The second stirring screw 644 is disposed in the second stirring chamber 640*b*. The carrier that is a magnetic material is contained in the second stirring chamber 640*b*.

The yellow toner is stirred together with the carrier by the first stirring screw 643 and the second stirring screw 644. As a result, a two-component developer containing the carrier and the yellow toner is formed.

The first stirring screw 643 and the second stirring screw 644 stir and circulate the two-component developer between the first stirring chamber 640*a* and the second stirring chamber 640*b*. As a result, the toner is charged to a specific polarity by friction with the carrier. In the second embodiment, the toner is charged to a positive polarity.

The magnetic roller 642 includes a magnet 642*b* and a rotation sleeve 642*a* that is non-magnetic. The magnet 642*b* is disposed to be fixed inside the rotation sleeve 642*a*. The magnet 642*b* has a plurality of polarities. The two-component developer is adsorbed to the magnetic roller 642 due to the presence of magnetic force of the magnet 642*b*. As a result, a magnetic brush is formed on the surface of the magnetic roller 642.

In the second embodiment, the magnetic roller 642 rotates in a direction (anticlockwise direction) indicated by an arrow R3 in FIG. 5. Rotation of the magnetic roller 642 conveys the magnetic brush to a location opposite to the blade 645. The blade 645 is disposed so as to form a gap (slit) between the blade 645 and the magnetic roller 642. As such, the thickness of the magnetic brush is defined by the blade 645. The blade 645 is disposed upstream of a location where the magnetic roller 642 is opposite to the development roller 641 in terms of the rotational direction of the magnetic roller 642.

A specific voltage is applied to the development roller 641 and the magnetic roller 642. When a specific potential difference arises between the development roller 641 and the magnetic roller 642 as a result of application of the specific voltage, the yellow toner included in the two-component developer moves to the development roller 641. This forms a thin toner layer of the yellow toner on the surface of the development roller 641.

The development roller 641 rotates in a direction (anticlockwise direction) indicated by an arrow R2 in FIG. 5. Through the rotation of the development roller 641, the thin toner layer formed on the surface of the development roller 641 is conveyed to a location opposite to the image bearing member 65 and attached to the image bearing member 65. In the manner described above, the development device 64 supplies the toner charged by friction with the carrier to the surface of the image bearing member 65.

The development device 64 of the first image forming unit 62Y has been described so far with reference to FIG. 5. The configurations of the development devices 64 of the first to fourth image forming units 62Y to 62K are the same as each other except the types of the toners supplied from the toner replenishing section 50. Therefore, description of the configuration of the development devices 64 of the second to fourth image forming units 62C to 62K is omitted.

An example of the image forming apparatus has been described so far with reference to FIGS. 4 and 5. However, the image forming apparatus is not limited to the above-described image forming apparatus 100. The image forming apparatus 100 is a color image forming apparatus, but the image forming apparatus may be a monochrome image forming apparatus. In this case, the image forming apparatus may include only one image forming unit, for example. Furthermore, the image forming apparatus 100 is a tandem image forming apparatus, but the image forming apparatus may be a rotary image forming apparatus, for example. A charging roller is exemplified as the charger 63. However, the charger may be a charger (e.g., a scorotron charger, a charging brush, or a corotron charger) other than the charging roller. The image forming apparatus 100 adopts a two-component development process using a two-component developer, but the image forming apparatus may adopt a one-component development process using a one-component developer. The image forming apparatus 100 adopts a touch down development process, but the image forming apparatus may adopt a development process (e.g., a development process using a magnetic roller serving also as a development roller rather than using a development roller) other than the touch down development process. The image forming apparatus 100 adopts an intermediate transfer process, but the image forming apparatus may adopt a direct transfer process. Where the image forming apparatus adopts a direct transfer process, a toner image is directly transferred to the recording medium P from the image bearing member 65 while the image bearing member 65 is in contact with the recording medium P. A cleaning blade is exemplified as the cleaning member 661, but the cleaning member may be a cleaning roller. Alternatively, the image forming apparatus may not include the cleaner 66. Moreover, the first to fourth image forming units 62Y to 62K each include the static eliminator 67, but each image forming unit may include no static eliminators.

Third Embodiment: Process Cartridge

With further reference to FIG. 4, a process cartridge according to a third embodiment of the present disclosure will be described next. The process cartridge of the third embodiment corresponds to each of the first to fourth image forming units 62Y to 62K. The process cartridge includes the image bearing member 65. The image bearing member 65 is the photosensitive member 1 of the first embodiment. As has a been described in the first embodiment, the photosensitive member 1 of the first embodiment includes a favorably formed photosensitive layer and has excellent abrasion resistance, filming resistance, and scratch resistance. As such, the process cartridge of the third embodiment includes the photosensitive member 1 being the image bearing member 65 that includes a favorably formed photosensitive layer and that has excellent abrasion resistance, filming resistance, and scratch resistance.

The process cartridge further includes at least one (e.g., at least one and no greater than six) selected from the group consisting of a charger 63, a light exposure device 61, a development device 64, a transfer device 70 (specifically, a primary transfer roller 71), a cleaner 66, and a static eliminator 67 in addition to the image bearing member 65. The process cartridge is designed to be freely attachable to and detachable from the image forming apparatus 100. As such, the process cartridge is easy to handle and the process cartridge including the image bearing member 65 can be replaced easily and quickly once a sensitivity characteristic or the like of the image bearing member 65 degrades. The process cartridge of the third embodiment has been described so far with reference to FIG. 4.

EXAMPLES

The following provides further specific description of the present disclosure through use of Examples. However, the present disclosure is not limited to the scope of Examples.

First, a charge generating material, electron transport materials, hole transport materials, polyarylate resins, and filler particles described below were prepared as materials for forming photosensitive layers of photosensitive members.

<Charge Generating Material, Electron Transport Material, and Hole Transport Material>

Y-form titanyl phthalocyanine described in the first embodiment was prepared as a charge generating material. The electron transport materials (E-1) to (E-8) described in the first embodiment were prepared each as an electron transport material. The hole transport materials (H-1) to (1-10) described in the first embodiment were prepared each as a hole transport material.

<Polyarylate Resins A to M, O, and P>

Polyarylate resins A to J of Examples and polyarylate resins K to M, O, and P of Comparative Examples were synthesized according to methods described below. The compositions of the respective polyarylate resins A to M, O, and P are shown below in Table 3.

TABLE 3

| | Bisphenol addition rate [%] | | | | Dicarboxylic acid addition rate [%] | | | | | |
|---|---|---|---|---|---|---|---|---|---|---|
| Monomer Formation unit | BisCZ Unit (1-1) | BisB Unit (1-2) | Bisz Unit (1-3) | BP Unit (3) | 14NACC Unit (4) | 26NACC Unit (2-1) | DPEC Unit (2-2) | TPC/IPC Unit (TPC/IPC) | Terminator | Molecular weight |
| Resin A | 95 | — | — | 5 | 50 | 50 | — | — | DMP | 55400 |
| Resin B | — | 95 | — | 5 | 50 | 50 | — | — | DMP | 64200 |
| Resin C | 90 | — | — | 10 | 50 | 50 | — | — | DMP | 54500 |
| Resin D | 81 | — | — | 19 | 50 | 50 | — | — | DMP | 52700 |
| Resin E | — | 81 | — | 19 | 50 | 50 | — | — | DMP | 62300 |
| Resin F | 95 | — | — | 5 | 35 | 65 | — | — | DMP | 58000 |
| Resin G | 95 | — | — | 5 | 65 | 35 | — | — | DMP | 54300 |
| Resin H | 95 | — | — | 5 | 50 | 50 | — | — | PFH | 56800 |
| Resin I | 95 | — | — | 5 | 50 | — | 50 | — | DMP | 58500 |
| Resin J | 95 | — | — | 5 | 35 | — | 65 | — | DMP | 58900 |
| Resin K | 100 | — | — | — | 50 | 50 | — | — | DMP | 55900 |
| Resin L | 95 | — | — | 5 | — | — | — | 50/50 | DMP | 50200 |
| Resin M | 100 | — | — | — | — | 50 | 50 | — | DMP | 57300 |
| Resin O | 50 | — | — | 50 | 50 | 50 | — | — | DMP | Unmeasurable |
| Resin P | — | — | 80 | 20 | — | — | 100 | — | DMP | Unmeasurable |

In Table 3, "BisCZ", "BisB," "BisZ", "BP", "14NACC", "26NACC", "DPEC", "TPC", and "IPC" respectively indicate compounds represented by the following formulas (BisCZ), (BisB), (BisZ), (BP), (14NACC), (26NACC), (DPEC), (TPC), and (IPC) (also referred to below as compounds (BisCZ), (BisB), (BisZ), (BP), (14NACC) (26NACC), (DPEC), (TPC) and (IPC), respectively).

(BisCZ)

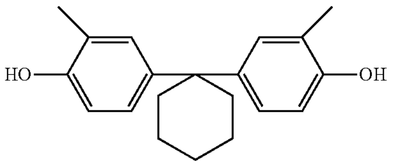

(14NACC)

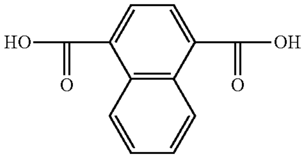

(BisB)

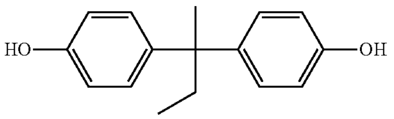

(26NACC)

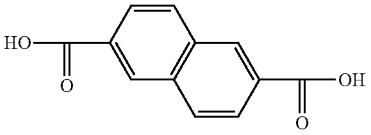

(BisZ)

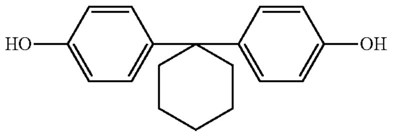

-continued (DPEC)

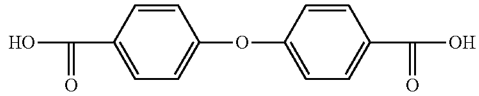

(BP)

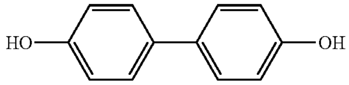

(TPC)

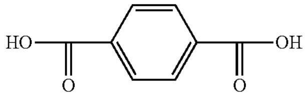

(IPC)

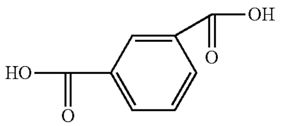

The terms in Table 3 mean as follows.

Monomer: monomer used for synthesis of corresponding polyarylate resin

Formation unit: repeating unit formed from corresponding monomer

Resin: polyarylate resin

Bisphenol addition rate: percentage (unit: %) of amount (unit: mol) of corresponding bisphenol monomer relative to total amount (unit: mol) of bisphenol monomer(s) added in synthesis of corresponding polyarylate resin Dicarboxylic acid addition rate: percentage (unit: %) of amount (unit: mol) of corresponding dicarboxylic acid relative to total amount (unit: mol) of dicarboxylic acid(s) added in synthesis of corresponding polyarylate resin Molecular weight: viscosity average molecular weight Unit: repeating unit TPC/IPC: mixture of compounds (TPC) and (IPC) at a molar ratio of 1/1

50/50 under column titled TPC/IPC: dicarboxylic acid addition rate of compound (TPC) being 50% and dicarboxylic acid addition rate of compound (IPC) being 50%

DMP: 2,6-dimethylphenol

PFH: 1H,1H-perfluoro-1-heptanol

Unmeasurable: measurement of viscosity average molecular weight being impossible due to corresponding polyarylate resin not dissolving in solvent for viscosity molecular weight measurement (Synthesis of Polyarylate Resin A)

A three-necked flask equipped with a thermometer, a three-way cock, and a dropping funnel was used as a reaction vessel. The compound (BisCZ) (38.95 mmol) being a monomer, the compound (BP) (2.05 mmol) being a monomer, 2,6-dimethyphenol (0.413 mmol) being a terminator, sodium hydroxide (98 mmol), and benzyltributylammonium chloride (0.384 mmol) were charged into the reaction vessel. The air in the reaction vessel was purged with an argon gas. Water (300 mL) was added to the contents of the reaction vessel. The contents of the reaction vessel were stirred at 50° C. for 1 hour. The contents of the reaction vessel were cooled to 10° C. Through the above, an alkaline aqueous solution S-A was yielded.

Next, dicarboxylic acid dichloride (16.0 mmol), which is a monomer, of the compound (14NACC) and dicarboxylic acid dichloride (16.0 mmol), which is a monomer, of the compound (26NACC) were dissolved in chloroform (150 mL). Through the above, a chloroform solution S-B was yielded.

The chloroform solution S-B was gradually dripped into the alkaline aqueous solution S-A over 110 minutes using the dropping funnel. The contents of the reaction vessel were stirred for 4 hours while the temperature (liquid temperature) of the contents of the reaction vessel was adjusted to 15±5° C. to allow a polymerization reaction of the contents of the reaction vessel to proceed. The upper layer (water layer) of the contents of the reaction vessel was removed using a decant to obtain an organic layer. Next, ion exchange water (400 mL) was added into a conical flask. The resultant organic layer was further added into the conical flask. Chloroform (400 mL) and acetic acid (2 mL) were further added into the conical flask. The contents of the conical flask were stirred at room temperature (25° C.) for 30 minutes. The upper layer (water layer) of the contents of the conical flask was removed using a decant to obtain an organic layer. The obtained organic layer was washed with ion exchange water (1 L) using a separatory funnel. The washing with ion exchange water was repeated 5 times to obtain a washed organic layer. Next, the washed organic layer was filtered to obtain a filtrate. The resultant filtrate was gradually dripped into methanol (1 L), thereby yielding a precipitate. The precipitate was taken out by filtration. The obtained precipitate was vacuum dried at a temperature of 70° C. for 12 hours. As a result, the polyarylate resin A was obtained.

(Synthesis of Polyarylate Resins B to M, O, and P)

The polyarylate resins B to M, O, and P were synthesized according to the same method as that for synthesis of the polyarylate resin A in all aspects other than use of the monomers shown in Table 3 at the respective addition rates shown in Table 3. Note that in synthesis of each of the polyarylate resins B to M, O, and P, the amount of each bisphenol monomer added was set so that the total amount of the bisphenol monomer(s) was 41.0 mmol and each bisphenol monomer had a corresponding bisphenol addition rate shown in Table 3. For example, in synthesis of the polyarylate resin B, the amount of the compound (BisB) added was 38.95 mmol (=41.0×95/100) and the amount, of the compound (BP) added was 2.05 mmol (=41.0×5/100). Furthermore, the amount of each dicarboxylic acid monomer added was set so that the total amount of the dicarboxylic acid monomer(s) was 32.0 mmol and each dicarboxylic acid monomer had a corresponding dicarboxylic acid addition rate shown in Table 3. For example, in synthesis of the polyarylate resin B, the amount of the compound (14NACC) added was 16.0 mmol (=32.0×50/100) and the amount of the compound (26NACC) added was 16.0 mmol=32.0×50/100).

Figure 6:
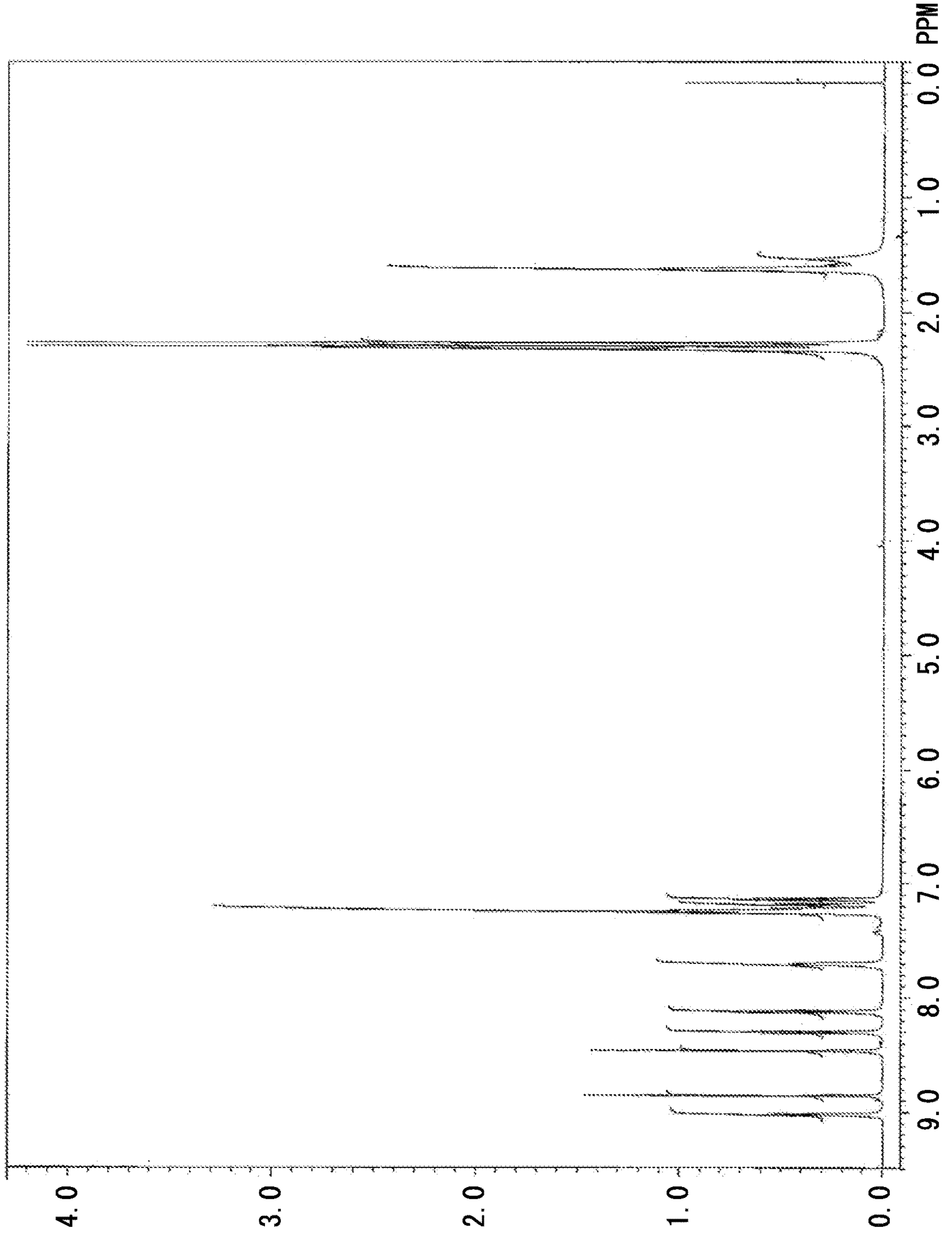
FIG. 6 is a $^1$H-NMR spectrum of a polyarylate resin H.

Each $^{1}$H-NMR spectrum of the resultant polyarylate resins A to M, O, and P was plotted using a proton nuclear magnetic resonance spectrometer (product of JEOL Ltd., 600 MHz). Deuterated chloroform was used as a solvent. Tetramethylsilane (TMS) was used as an internal standard sample. The $^{1}$H-NMR spectrum of the polyarylate resin H is shown in FIG. 6 as a typical example of the polyarylate resins A to M, O, and P. It was confirmed from the chemical shift read from the $^{1}$H-NMR spectrum that the polyarylate resin H had been obtained. With respect to each of the polyarylate resins A to G, I to M, O, and P, it was also confirmed by the same method as above that the polyarylate resins A to G, I to M, O, and P had been obtained.

<Polyarylate Resin N>

A polyarylate resin N of a Comparative Example was prepared. The polyarylate resin N was represented by the following formula (N). In formula (N), the number attached to the lower right of each repeating unit derived from a corresponding bisphenol indicates a percentage (unit: %) of the number of repeats of the repeating unit derived from the bisphenol relative to the total of the numbers of repeats of all repeating units derived from bisphenols included in the polyarylate resin N. Also, the number attached to the lower right of each repeating unit derived from a corresponding dicarboxylic acid indicates a percentage (unit: %) of the number of repeats of the repeating unit derived from the dicarboxylic acid relative to the total of the numbers of repeats of all repeating units derived from dicarboxylic acids included in the polyarylate resin N. The polyarylate resin N had an end group derived from 2,6-dimethylphenol as an end group. The polyarylate resin N had a viscosity average molecular weight of 54,400.

sensitive layer formation. The application liquid for photosensitive layer formation was applied onto a conductive substrate (drum-shaped aluminum support) by dip coating, and hot-air dried at 120° C. for 50 minutes. In the manner described above, a photosensitive layer (film thickness 30 μm) was formed on the conductive substrate to obtain a photosensitive member (A-1). In the photosensitive member (A-1), a photosensitive layer of a single layer was directly provided on the conductive substrate.

(Production of Photosensitive Members (A-2) to (A-10), (B-2), (B-4), (B-6), (B-8), (B-10), and (B-12))

Photosensitive members (A-2) to (A-10), (B-2), (B-4), (B-6). (B-8), (B-10), and (B-12) were produced according to (N)

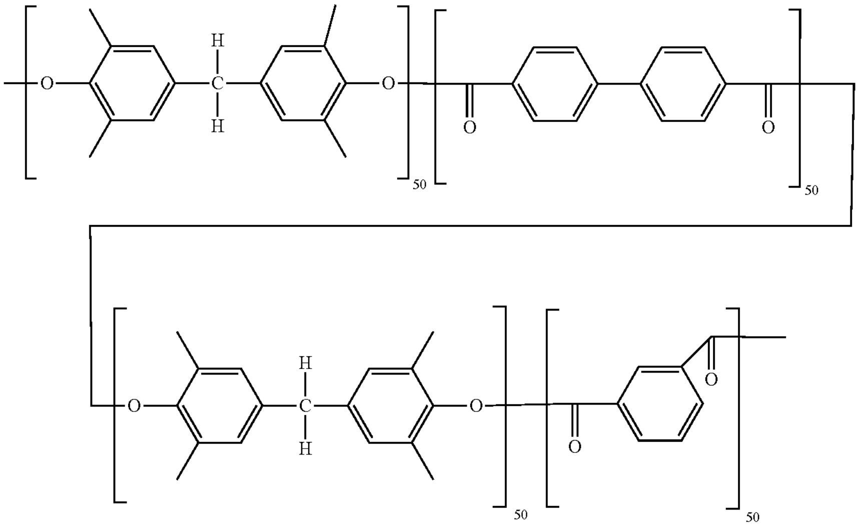

the same method as that for producing the photosensitive member (A-1) in all aspects other than the use of the electron transport material, the hole transport material, and the polyarylate resins shown in Tables 5 and 7.

Viscosity Average Molecular Weight Measurement>

The viscosity average molecular weight of each polyarylate resin was measured in accordance with the Japanese Industrial Standards (JTS) K7252-1:2016. The measured viscosity average molecular weights are shown in Table 3.

<Filler Particles>

Filler particles (F-1) to (F-4) shown in Table 4 were prepared as filler particles. Note that the filler particles (F-1) to (F-4) were resin particles.

TABLE 4

| Filler particles | Material | | $D_{50}$ (μm) | Trade name | Manufacturer |
|---|---|---|---|---|---|
| F-1 | Resin | Silicone Resin | 0.70 | X-52-854 | Shin-Etsu Chemical Co., Ltd. |
| F-2 | Resin | Silicone Resin | 2.00 | KMP-590 | Shin-Etsu Chemical Co., Ltd. |
| F-3 | Resin | Silicone Resin | 5.00 | X-52-1621 | Shin-Etsu Chemical Co., Ltd. |
| F-4 | Resin | Silicone Resin | 0.50 | MSP-N050 | Nikko Rica Corporation |

<Photosensitive Member Production>

(Production of Photosensitive Member (A-1))

A dispersion was obtained by mixing 2.0 parts by mass of Y-form titanyl phthalocyanine being a charge generating material, 70.0 parts by mass of the hole transport material (H-1), 50.0 parts by mass of the electron transport material (E-1), 100.0 parts by mass of the polyarylate resin A being a binder resin, and 500.0 parts by mass of tetrahydrofuran being a solvent for 20 minutes using a rod-shaped sonic oscillator. The dispersion was filtered using a filter with an opening of 5 μm to obtain an application liquid for photo- (Production of Photosensitive Member (A-11))

A dispersion was obtained by mixing 2.0 parts by mass of Y-form titanyl phthalocyanine being a charge generating material, 70.0 parts by mass of the hole transport material (H-1), 50.0 parts by mass of the electron transport material (E-1), 100.0 parts by mass of the polyarylate resin A being a binder resin, 5.9 parts by mass of the filler particles (F-1), and 500.0 parts by mass of tetrahydrofuran being a solvent using a rod-shaped sonic oscillator for 20 minutes. The dispersion was filtered using a filter with an opening of 5 μm to obtain an application liquid for photosensitive layer formation. The application liquid for photosensitive layer formation was applied onto a conductive substrate (drum-shaped aluminum support) by dip coating, and hot-air dried at 120° C. for 50 minutes. In the manner described above, a photosensitive layer (film thickness 30 μm) was formed on the conductive substrate to obtain a photosensitive member (A-11). In the photosensitive member (A-11), a photosensitive layer of a single layer was directly provided on the conductive substrate. The percentage content of the filler particles relative to the mass of the photosensitive layer of the photosensitive member (A-11) was calculated to be 2.6% by mass using a calculation formula "(percentage content of filler particles)=100×(mass of filler particles)/[(mass of charge generating material)+(mass of hole transport material)+(mass of electron transport material)+(mass of binder resin)+(mass of filler particles)]=100×5.9/(2.0+70.0+50.0+100.0+5.9)".

(Production of Photosensitive Members (A-12) to (A-39), (A-43), (A-44), (B-1), (B-3), (B-5), (B-7), (B-9), and (B-11))

Photosensitive members (A-12) to (A-39), (A-43), (A-44), (B-1), (B-3), (B-5), (B-7), (13-9), and (B-11) were produced according to the same method as that for producing the photosensitive member (A-11) in all aspects other than use of the electron transport materials, the hole transport materials, the polyarylate resins, and the filler particles shown in Tables 5 to 7.

(Production of Photosensitive Members (A-40) to (A-42))

Photosensitive members (A-40) to (A-42) were produced according to the same method as that for producing the photosensitive member (A-11) in all aspects other than that the filler particles (F-1) were added in the amounts that brought the percentage contents of the filler particles to the respective corresponding values shown in Table 6, instead of 5.9 parts by mass of the filler particles (F-1). Note that 11.7 parts by mass of the filler particles (F-1) were added in production of the photosensitive member (A-40). In production of the photosensitive member (A-41), 23.3 parts by mass of the filler particles (F-1) were added. In production of the photosensitive member (A-42), 27.4 parts by mass of the filler particles (F-11) were added.

<Evaluation>

With respect to each of the produced photosensitive members, abrasion resistance, filming resistance, and scratch resistance were evaluated according to the methods described below. In each evaluation, paper (ASKUL MULTIPAPER SUPER ECONOMY+" available at ASKUL Corporation) was used. Also, a modified version of an image forming apparatus ("FS-C5250DN", product of KYOCERA Document Solutions Inc.) was used as an evaluation apparatus for carrying out each evaluation. The evaluation apparatus included as a charger a charging roller constituted by an epichlorohydrin resin in which conductive carbon has been dispersed. The charging polarity of the charging roller was a positive polarity and an application voltage of the charging roller was a direct current voltage. The evaluation apparatus adopted a two-component development process and an intermediate transfer process. The evaluation apparatus further included a cleaning blade and a static eliminator.

(Evaluation of Abrasion Resistance)

Evaluation of abrasion resistance was carried out in an environment at a temperature of 23° C. and a relative humidity of 50%. A film thickness T1 of the photosensitive layer of the photosensitive member was measured. Next, the photosensitive member was mounted in the evaluation apparatus. An image I (character image with a printing rate of 5%) was consecutively printed on 50,000 sheets of the paper using the evaluation apparatus. A film thickness T2 of the photosensitive layer of the photosensitive member was measured after the printing. Note that an eddy current film thickness meter ("LH-373", product of Kett Electric Laboratory) was used for measurement of the film thicknesses T1 and T2. Then, an abrasion amount (unit: μm) of the photosensitive layer was calculated using an equation "abrasion amount=T1−T2". The calculated abrasion amounts are shown in Tables 5 to 7. A less abrasion amount indicates more excellent abrasion resistance of the photosensitive member.

(Evaluation of Filming Resistance and Scratch Resistance)

The photosensitive member after the evaluation of abrasion resistance was mounted in the evaluation apparatus. An image I (character image with a printing rate of 5%) was consecutively printed on 50,000 sheets of the paper using the evaluation apparatus in an environment at a temperature of 23° C. and a relative humidity of 50%. Next, an image II (image including a halftone image and a blank image) was printed on one sheet of the paper using the evaluation apparatus, and the obtained image was taken to be a first evaluation image.

Next, the image I (character image with a printing rate of 5%) was consecutively printed on 50,000 sheets of the paper using the evaluation apparatus in an environment at a temperature of 10° C. and a relative humidity of 15%. Next, the image II (image including a halftone image and a blank image) was printed on one sheet of the paper using the evaluation apparatus, and the obtained image was taken to be a second evaluation image.

After the second evaluation image was obtained, the photosensitive member was taken out of the evaluation apparatus. The surface of the photosensitive member was observed with the unaided eye to check the occurrence or non-occurrence of filming and the presence or absence of scratches in the surface of the photosensitive member. Furthermore, the first evaluation image and the second evaluation image were observed to check the presence or absence of image defects. Specifically, the image defects refer to image defects resulting from scratches and/or filming. Examples of image defects resulting from scratches include white lines and black lines. Examples of image defects resulting from filming include dash marks and fogging. The dash marks refer to black spots lining in parallel to a conveyance direction of the paper. The larger the area of the surface of a photosensitive member in which filming occurs is, the more likely fogging starting from a dash nark is to occur in image formation. Filming resistance and scratch resistance were evaluated according to the following criteria from the result of the observation of the surface of the photosensitive member and the result of the checking of image defects in the first evaluation image and the second evaluation image. Result of evaluation of filming resistance and scratch resistance are shown in Tables 5 to 7.

Evaluation A (particularly good): Neither scratches nor filming was observed in the surface of the photosensitive member. Further, no image defects were observed in both the first evaluation image and the second evaluation image.

Evaluation B (good): At least one of a scratch and filming was observed in the surface of the photosensitive member. However, no image defects were observed in both the first evaluation image and the second evaluation image.

Evaluation C (poor): At least one of a scratch and filming was observed in the surface of the photosensitive member. An image defect was observed in the second evaluation image. However, no image defects were observed in the first evaluation image.

Evaluation D (particularly poor): At least one of a scratch and filming was observed in the surface of the photosensitive member. Further, an image defect was observed in both the first evaluation image and the second evaluation image.

The terms in Tables 5 to 7 mean as follows. "ETM" indicates an electron transport material. "HTM" indicates a hole transport material. "Resin" indicates a polyarylate resin being a binder resin. "Filler" indicates filler particles. "Percentage content" under the column titled "Filler" indicates a percentage content (unit: wt %, i.e., % by mass) of filler particles relative to the mass of a corresponding photosensitive layer. "Filming-scratch" indicates corresponding results of evaluation of filming resistance and scratch resistance. "Preparation impossible" indicates that corresponding evaluation and measurement were not able to carry out because of a corresponding application liquid for photosensitive layer formation not being able to be prepared due to insolubility of a corresponding polyarylate resin in a solvent for forming the application liquid for photosensitive layer formation. Further, "-" indicates non-use of a corresponding component.

TABLE 5

| | Photosensitive member | ETM | HTM | Resin | Filler Type | Filler Percentage content [wt %] | Abrasion Amount [μm] | Filming-scratch |
|---|---|---|---|---|---|---|---|---|
| Example 1 | A-1 | E-1 | H-1 | A | — | — | 1.4 | A |
| Example 2 | A-2 | E-1 | H-1 | B | — | — | 1.8 | B |
| Example 3 | A-3 | E-1 | H-1 | C | — | — | 1.2 | A |
| Example 4 | A-4 | E-1 | H-1 | D | — | — | 1.0 | A |
| Example 5 | A-5 | E-1 | H-1 | E | — | — | 1.6 | B |
| Example 6 | A-6 | E-1 | H-1 | F | — | — | 1.3 | A |
| Example 7 | A-7 | E-1 | H-1 | G | — | — | 1.5 | A |
| Example 8 | A-8 | E-1 | H-1 | H | — | — | 1.2 | A |
| Example 9 | A-9 | E-1 | H-1 | I | — | — | 1.5 | A |
| Example 10 | A-10 | E-1 | H-1 | J | — | — | 1.6 | A |
| Example 11 | A-11 | E-1 | H-1 | A | F-1 | 2.6 | 1.1 | A |
| Example 12 | A-12 | E-1 | H-1 | B | F-1 | 2.6 | 1.4 | B |
| Example 13 | A-13 | E-1 | H-1 | C | F-1 | 2.6 | 1.0 | A |
| Example 14 | A-14 | E-1 | H-1 | D | F-1 | 2.6 | 0.8 | A |
| Example 15 | A-15 | E-1 | H-1 | E | F-1 | 2.6 | 1.3 | B |
| Example 16 | A-16 | E-1 | H-1 | F | F-1 | 2.6 | 1.0 | A |
| Example 17 | A-17 | E-1 | H-1 | G | F-1 | 2.6 | 1.2 | A |
| Example 18 | A-18 | E-1 | H-1 | H | F-1 | 2.6 | 1.0 | A |
| Example 19 | A-19 | E-1 | H-1 | I | F-1 | 2.6 | 1.2 | A |
| Example 20 | A-20 | E-1 | H-1 | J | F-1 | 2.6 | 1.3 | A |

TABLE 6

| | Photosensitive member | ETM | HTM | Resin | Filler Type | Filler Percentage content [wt %] | Abrasion amount [μm] | Filming-scratch |
|---|---|---|---|---|---|---|---|---|
| Example 21 | A-21 | E-2 | H-1 | A | F-1 | 2.6 | 1.1 | A |
| Example 22 | A-22 | E-3 | H-1 | A | F-l | 2.6 | 1.2 | A |
| Example 23 | A-23 | E-4 | H-1 | A | F-1 | 2.6 | 1.2 | A |
| Example 24 | A-24 | E-5 | H-1 | A | F-1 | 2.6 | 1.2 | A |
| Example 25 | A-25 | E-6 | H-1 | A | F-1 | 2.6 | 1.1 | A |
| Example 26 | A-26 | E-7 | H-1 | A | F-1 | 2.6 | 1.1 | A |
| Example 27 | A-27 | E-8 | H-1 | A | F-1 | 2.6 | 1.1 | A |
| Example 28 | A-28 | E-1 | H-2 | A | F-1 | 2.6 | 1.2 | A |
| Example 29 | A-29 | E-1 | H-3 | A | F-1 | 2.6 | 1.2 | A |
| Example 30 | A-30 | E-1 | H-4 | A | F-1 | 2.6 | 1.1 | A |
| Example 31 | A-31 | E-1 | H-5 | A | F-1 | 2.6 | 1.1 | A |
| Example 32 | A-32 | E-1 | H-6 | A | F-1 | 2.6 | 1.1 | A |
| Example 33 | A-33 | E-1 | H-7 | A | F-1 | 2.6 | 1.1 | A |
| Example 34 | A-34 | E-1 | H-8 | A | F-1 | 2.6 | 1.2 | A |
| Example 35 | A-35 | E-1 | H-9 | A | F-1 | 2.6 | 1.1 | A |
| Example 36 | A-36 | E-1 | H-10 | A | F-1 | 2.6 | 1.1 | A |
| Example 37 | A-37 | E-1 | H-1 | A | F-2 | 2.6 | 1.6 | A |
| Example 38 | A-38 | E-1 | H-1 | A | F-3 | 2.6 | 1.5 | A |
| Example 39 | A-39 | E-1 | H-1 | A | F-4 | 2.6 | 1.6 | A |
| Example 40 | A-40 | E-1 | H-1 | A | F-1 | 5.0 | 1.0 | A |
| Example 41 | A-41 | E-1 | H-1 | A | F-1 | 9.5 | 1.0 | A |
| Example 42 | A-42 | E-1 | H-1 | A | F-1 | 11.0 | 1.1 | A |
| Example 43 | A-43 | E-1 | H-1 | I | F-1 | 2.6 | 1.3 | B |
| Example 44 | A-44 | E-1 | H-2 | H | F-1 | 2.6 | 1.0 | A |

TABLE 7

| | Photosensitive member | ETM | HTM | Resin | Filler Type | Filler Percentage content [wt %] | Abrasion amount [μm] | Filming-scratch |
|---|---|---|---|---|---|---|---|---|
| Comparative Example 1 | B-1 | E-1 | H-1 | K | F-1 | 2.6 | 2.2 | A |
| Comparative Example 2 | B-2 | E-1 | H-1 | K | — | — | 2.6 | A |
| Comparative Example 3 | B-3 | E-1 | H-1 | L | F-1 | 2.6 | 3.1 | C |
| Comparative Example 4 | B-4 | E-1 | H-1 | L | — | — | 3.4 | C |

TABLE 7-continued

| | Photosensitive member | ETM | HTM | Resin | Filler Type | Filler Percentage content [wt %] | Abrasion amount [μm] | Filming-scratch |
|---|---|---|---|---|---|---|---|---|
| Comparative Example 5 | B-5 | E-1 | H-1 | M | F-1 | 2.6 | 2.1 | B |
| Comparative Example 6 | B-6 | E-1 | H-1 | M | — | — | 2.4 | B |
| Comparative Example 7 | B-7 | E-1 | H-1 | N | F-1 | 2.6 | 3.4 | D |
| Comparative Example 8 | B-8 | E-1 | H-1 | N | — | — | 3.8 | D |
| Comparative Example 9 | B-9 | E-1 | H-1 | O | F-1 | 2.6 | Preparation impossible | |
| Comparative Example 10 | B-10 | E-1 | H-1 | O | — | — | Preparation impossible | |
| Comparative Example 11 | B-11 | E-1 | H-1 | P | F-1 | 2.6 | Preparation impossible | |
| Comparative Example 12 | B-12 | E-1 | H-1 | P | — | — | Preparation impossible | |

As can be understood from Table 3, the polyarylate resins K to M, O, and P each were not a resin encompassed in the polyarylate resin (PA). As can be also understood from formula (N), the polyarylate resin N was not a resin encompassed in the polyarylate resin (PA). As can be understood from Table 7, none of the photosensitive layers of the photosensitive members (B-1) to (B-8) contained a resin encompassed in the polyarylate resin (PA). Therefore, the photosensitive members (B-1) to (B-8) each had poor abrasion resistance as shown in Table 7. Furthermore, filming resistance and scratch resistance of the photosensitive members (B-3), (B-4), (B-7), and (B-8) were rated as poor or very poor as shown in Table 7. As also shown in Table 7, the photosensitive layer of each of the photosensitive members (B-9) to (B-12) was not able to form because of a corresponding application liquid for photosensitive layer formation not being able to be prepared due to insolubility of the polyarylate resin O or P in a solvent for forming the application liquid for photosensitive layer formation.

As can be understood from Table 3 by contrast, the polyarylate resins A to J each were a resin encompassed in the polyarylate resin (PA). As can be understood from Tables 5 and 6, the photosensitive layers of the photosensitive members (A-1) to (A-44) each contained a resin encompassed in the polyarylate resin (PA). Therefore, the photosensitive members (A-1) to (A-44) each had a favorably formed photosensitive layer and were excellent in abrasion resistance, filming resistance, and scratch resistance.

It was demonstrated from the above that the photosensitive member according to the present disclosure that encompasses the photosensitive members (A-1) to (A-44) can include a favorably formed photosensitive layer and can have increased abrasion resistance, filming resistance, and scratch resistance. Furthermore, as a result of including a photosensitive member such as above, the process cartridge and the image forming apparatus according to the present disclosure can be determined to have increased abrasion resistance, filming resistance and scratch resistance.

What is claimed is:

1. An electrophotographic photosensitive member comprising:

a conductive substrate; and a photosensitive layer, wherein the photosensitive layer is a single layer, the photosensitive layer contains a charge generating material, a hole transport material, an electron transport material, and a binder resin, the binder resin includes a polyarylate resin, the polyarylate resin includes repeating units represented by formulas (1), (2), (3), and (4), and a percentage of the number of repeats of the repeating unit represented by the formula (3) relative to a total of the number of repeats of the repeating unit represented by the formula (1) and the number of repeats of the repeating unit represented by the formula (3) is greater than 0% and less than 20%, the repeating unit represented by the formula (1) is adjacent and bonded to the repeating unit represented by the formula (2), and/or the repeating unit represented by the formula (1) is adjacent and bonded to the repeating unit represented by the formula (4), the repeating unit represented by the formula (3) is adjacent and bonded to the repeating unit represented by the formula (2), and/or the repeating unit represented by the formula (3) is adjacent and bonded to the repeating unit represented by the formula (4), (1)

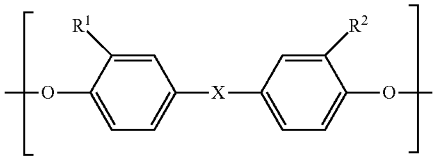

(2)

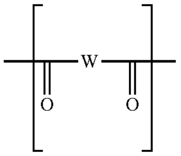

(3)

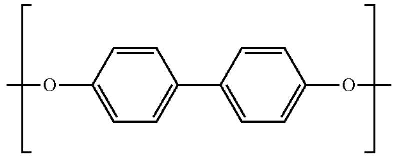

(4)

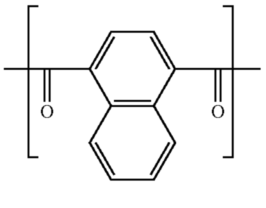

wherein the formula (1), R1 and R2 each represent, independently of one another, a hydrogen atom or a methyl group and X represents a divalent group represented by formula (X1) or (X2), and in the formula (2), W represents a divalent group represented by formula (W1) or (W2), (X1)

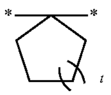

(X2)

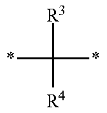

wherein the formula (X1), t represents an integer of at least 1 and no greater than 3 and represents a bond, and in the formula (X2), R3 and R4 each represent a hydrogen atom or an alkyl group with a carbon number of at least 1 and no greater than 4, R3 and R4 represent chemical groups different from each other, and * represents a bond, (W1)

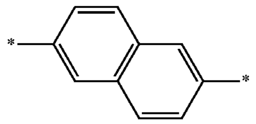

(W2)

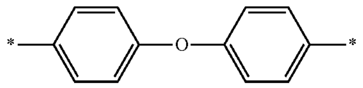

wherein the formulas (W1) and (W2), * represents a bond.

2. The electrophotographic photosensitive member according to claim 1, wherein in the formula (1), R1 and R2 each represent a methyl group and X represents a divalent group represented by the formula (X1).

3. The electrophotographic photosensitive member according to claim 1, wherein the repeating unit represented by the formula (1) is a repeating unit represented by formula (1-1)

(1-1)

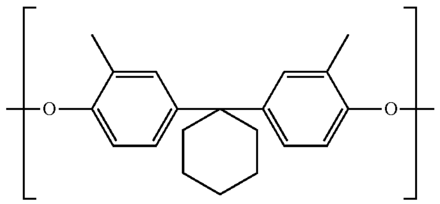

.

4. The electrophotographic photosensitive member according to claim 1, wherein the repeating unit represented by the formula (1) is a repeating unit represented by formula (1-1), and the repeating unit represented by the formula (2) is a repeating unit represented by formula (2-1)

(1-1)

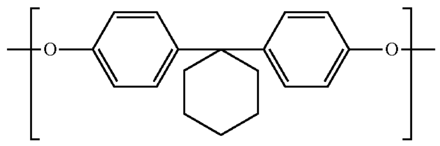

(2-1)

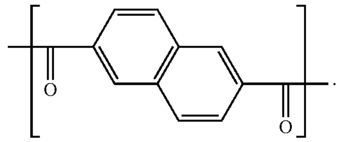

.

5. The electrophotographic photosensitive member according to claim 1, wherein the repeating unit represented by the formula (1) is a repeating unit represented by formula (1-1), and the repeating unit represented by the formula (2) is a repeating unit represented by formula (2-2)

(1-1)

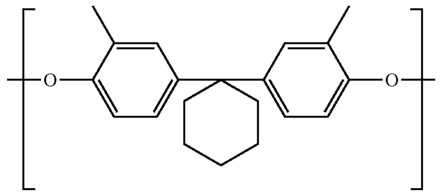

(2-2)

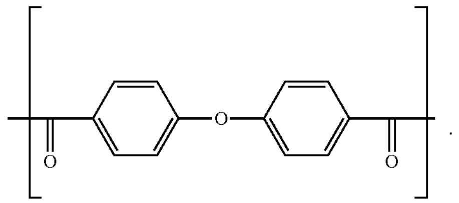

.

6. The electrophotographic photosensitive member according to claim 1, wherein in the formula (1), R1 and R2 each represent a hydrogen atom and X represents a divalent group represented by the formula (X2).

7. The electrophotographic photosensitive member according to claim 1, wherein the repeating unit represented by the formula (1) is a repeating unit represented by formula (1-2)

(1-2)

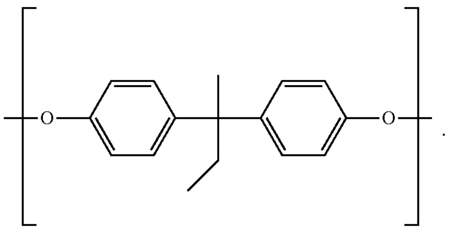

.

8. The electrophotographic photosensitive member according to claim 1, wherein the repeating unit represented by the formula (1) is a repeating unit represented by formula (1-2), and the repeating unit represented by the formula (2) is a repeating unit represented by formula (2-1)

(1-2)

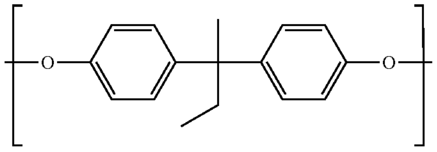

(2-1)

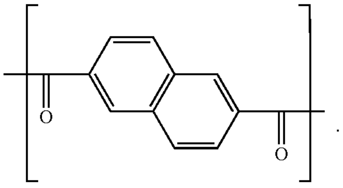

9. The electrophotographic photosensitive member according to claim 1, wherein the photosensitive layer further contains resin particles.

10. The electrophotographic photosensitive member according to claim 9, wherein the resin particles have a volume median diameter of at least 0.05 μm and no greater than 5.00 μm.

11. The electrophotographic photosensitive member according to claim 9, wherein a percentage content of the resin particles relative to a mass of the photosensitive layer is at least 0.01% by mass and no greater than 15.0% by mass.

12. The electrophotographic photosensitive member according to claim 9, wherein the resin particles are spherical in shape.

13. The electrophotographic photosensitive member according to claim 1, wherein the electron transport material includes a compound represented by formula (11), (12), (13), (14), (15), (16), or (17), (11)

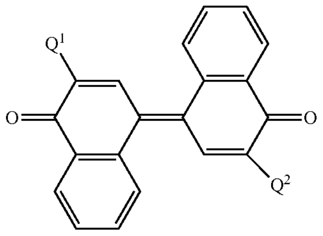

(12)

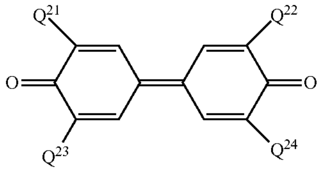

(13)

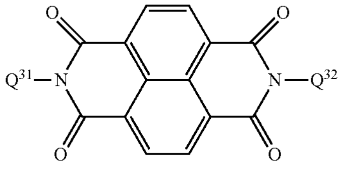

-continued (14)

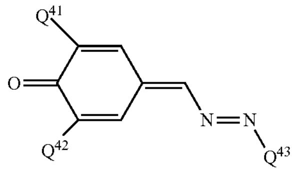

(15)

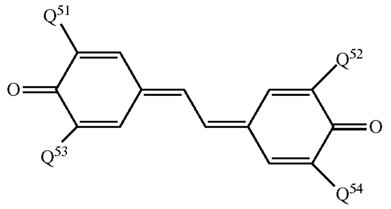

(16)

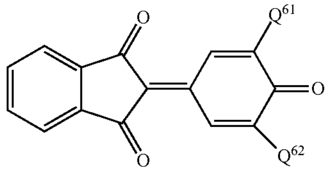

(17)

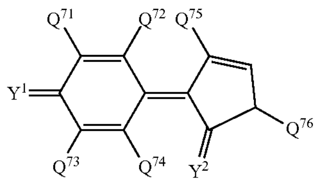

where Q1 and Q2 in the formula (11), Q21, Q22, Q23 and Q24 in the formula (12), Q31 and Q32 in the formula (13), Q41, Q42, and Q43 in the formula (14), Q51, Q52, Q53, and Q54 in the formula (15), Q61 and Q62 in the formula (16), and Q71, Q72, Q73, Q74, Q75, and Q76 in the formula (17) each represent, independently of one another, a hydrogen atom, a halogen atom, a cyano group, an alkyl group with a carbon number of at least 1 and no greater than 6, an alkenyl group with a carbon number of at least 2 and no greater than 6, an alkoxy group with a carbon number of at least 1 and no greater than 6, or an aryl group with a carbon number of at least 6 and no greater than 14 optionally substituted with at least one substituent selected from the group consisting of a halogen atom and an alkyl group with a carbon number of at least 1 and no greater than 6, and in the formula (17), Y1 and Y2 each represent, independently of one another, an oxygen atom or a sulfur atom.

14. The electrophotographic photosensitive member according to claim 1, wherein the electron transport material includes a compound represented by formula (E-1), (E-2), (E-3), (E-4), (E-5), (E-6), (E-7), or (E-8)

(E-1)
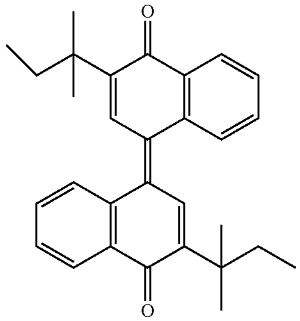
(E-2)
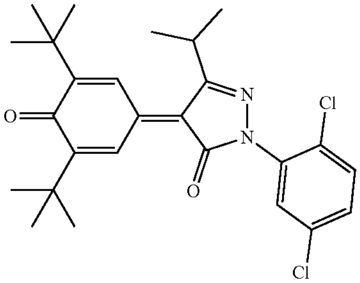
(E-3)
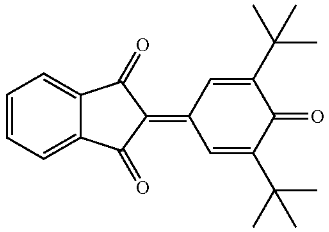
(E-4)
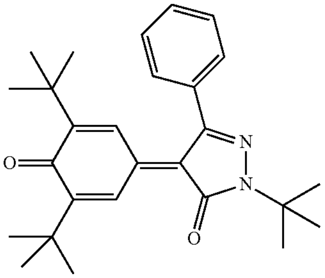
-continued
(E-5)
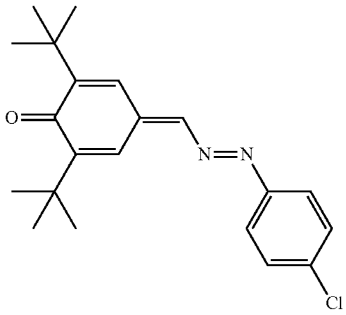
(E-6)
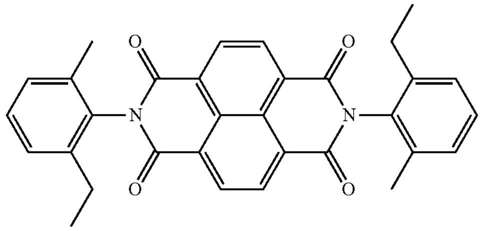
(E-7)
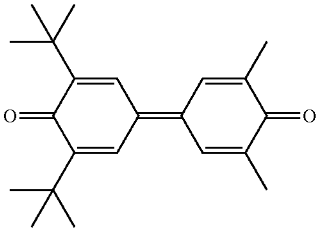
(E-8)
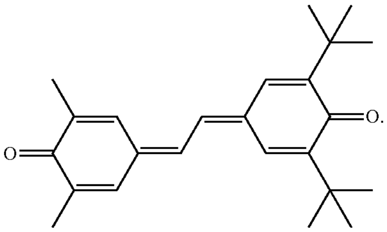
15. The electrophotographic photosensitive member according to claim 1, wherein
the hole transport material includes a compound represented by formula (20) or (23),
(20)
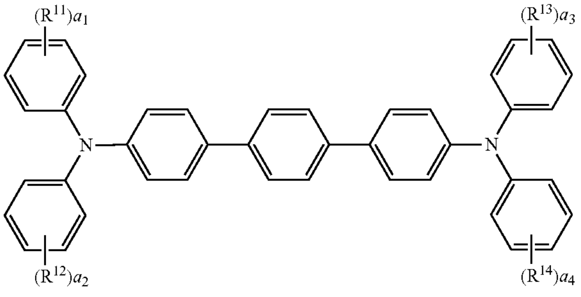

-continued (23)

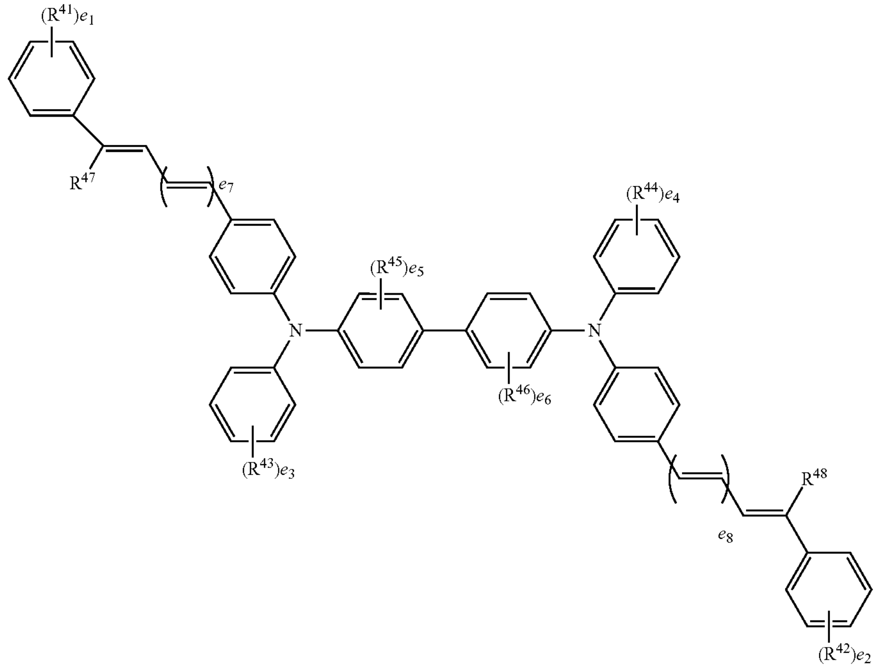

wherein the formula (20), R11, R12, R13, and R14 each represent, independently of one another, an alkyl group with a carbon number of at least 1 and no greater than 6 or an alkoxy group with a carbon number of at least 1 and no greater than 6 and a1, a2, a3, and a4 each represent, independently of one another, an integer of at least 0 and no greater than 5, and in the formula (23), R41, R42, R43, R44, R45, and R46 each represent, independently of one another, a phenyl group or an alkyl group with a carbon number of at least 1 and no greater than 6, R47 and R48 each represent, independently of one another, a hydrogen atom, a phenyl group, or an alkyl group with a carbon number of at least 1 and no greater than 6, e1, e2, e3, and e4 each represent, independently of one another, an integer of at least 0 and no greater than 5, e5 and e6 each represent, independently of one another, an integer of at least 0 and no greater than 4, and e7 and e6 each represent, independently of one another, 0 or 1.

16. The electrophotographic photosensitive member according to claim 1, wherein the charge generating material includes a phthalocyanine pigment.

17. A process cartridge comprising:

at least one selected from the group consisting of a charger, a light exposure device, a development device, a transfer device, a cleaner, and a static eliminator; and the electrophotographic photosensitive member according to claim 1.

18. An image forming apparatus comprising:

an image bearing member;

a charger configured to charge a surface of the image bearing member;

a light exposure device configured to expose the charged surface of the image bearing member to light to form an electrostatic latent image on the surface of the image bearing member;

a development device configured to develop the electrostatic latent image into a toner image by supplying toner to the surface of the image bearing member; and a transfer device configured to transfer the toner image from the image bearing member to a transfer target, wherein the image bearing member is the electrophotographic photosensitive member according to claim 1.

19. The image forming apparatus according to claim 18, further comprising either or both a cleaner configured to collect toner of the toner attached to the surface of the image bearing member and a static eliminator configured to eliminate static electricity from the surface of the image bearing member.

20. The image forming apparatus according to claim 18, wherein the charger is a charging roller.

* * * * *